US008527403B2

(12) United States Patent
Shao et al.

(10) Patent No.: US 8,527,403 B2
(45) Date of Patent: Sep. 3, 2013

(54) LATENESS MIGRATION MODEL

(75) Inventors: Yanghong Shao, Charlotte, NC (US); Debashis Ghosh, Charlotte, NC (US); Thayer S. Allison, Jr., Charlotte, NC (US); Mark V. Krein, Charlotte, NC (US); David Joa, Irvine, CA (US); Kurt D. Newman, Matthews, NC (US); Timothy J. Bendel, Charlotte, NC (US); Sudeshna Banerjee, Waxhaw, NC (US)

(73) Assignee: Bank of America Corporation, Charlotte, NC (US)

( * ) Notice: Subject to any disclaimer, the term of this patent is extended or adjusted under 35 U.S.C. 154(b) by 537 days.

(21) Appl. No.: 12/692,412

(22) Filed: Jan. 22, 2010

(65) Prior Publication Data

US 2011/0184777 A1 Jul. 28, 2011

(51) Int. Cl.
*G06Q 40/00* (2012.01)
(52) U.S. Cl.
USPC .......................................................... 705/38
(58) Field of Classification Search
USPC .................................................. 705/38, 7.33
See application file for complete search history.

(56) References Cited

U.S. PATENT DOCUMENTS

| | | | | |
|---|---|---|---|---|
| 6,321,206 | B1 * | 11/2001 | Honarvar ..................... | 705/7.33 |
| 6,622,126 | B1 * | 9/2003 | McArdle et al. ............. | 705/7.33 |
| 7,277,869 | B2 * | 10/2007 | Starkman ...................... | 705/38 |
| 2009/0150312 | A1 | 6/2009 | Abrahams et al. | |
| 2009/0171756 | A1 | 7/2009 | De Zilwa et al. | |

OTHER PUBLICATIONS

White Paper: from Goliath website: "Ins and Outs of Loss Forecasting: Finding the Best Way to Predict Portfolio Performance Can Be Different for Every Organization, but it is Critical for All", Collections & Credit Risk, published Jan. 1, 2004; (2 pages total).
Desai, Vijay, "Loss Forecasting for Consumer Loan Portfolios", CSCC IX, Edinburgh Sep. 8, 2005 (39 pages total).
The Experian Decision Analytics Newsletter—Nov. 2007—Forecasting, "Loss Forecasting and Provisioning" (3 pages total); http://www.experian-da.com/Web/News/Newsletters/0710/Forecasting.html.

* cited by examiner

*Primary Examiner* — Samica L Norman
(74) *Attorney, Agent, or Firm* — Michael A. Springs; Moore and Van Allen, PLLC; Patrick B. Horne

(57) ABSTRACT

In general, embodiments of the invention relate to systems, methods, and computer program products for predicting population migration and analyzing migration-affecting programs. For example, an apparatus is provided having a memory device with population information and a plurality of migration factors stored therein. The population information includes information about population distribution across a plurality of classifications. Each of the plurality of migration factors corresponds to a particular classification of the plurality of classifications and indicates how population members of the particular classification migrate to other classifications over a particular time period. The apparatus also includes a processor communicably coupled to the memory device and configured to use the migration factors and the population information to forecast changes in the population distribution across each of the plurality of classifications over multiple time periods. In one embodiment, the systems, methods, and computer program products are configured to predict lateness characteristics of a lending portfolio.

28 Claims, 11 Drawing Sheets

FIG. 2 — FORECASTING FUTURE FLOWS, WITHOUT AGGREGATION

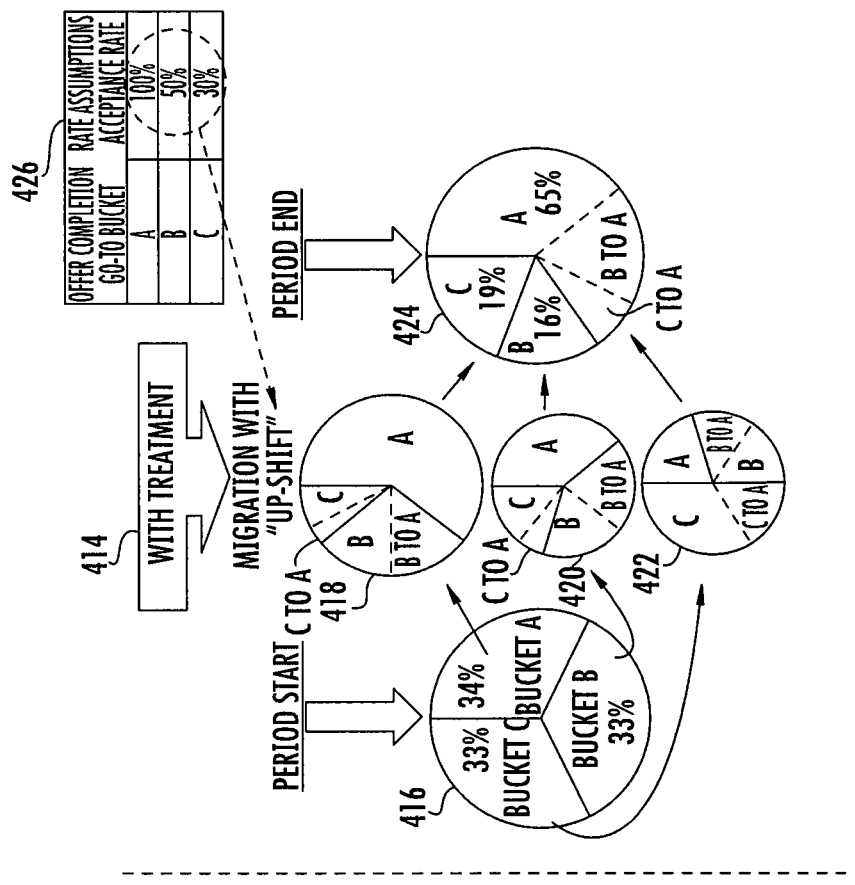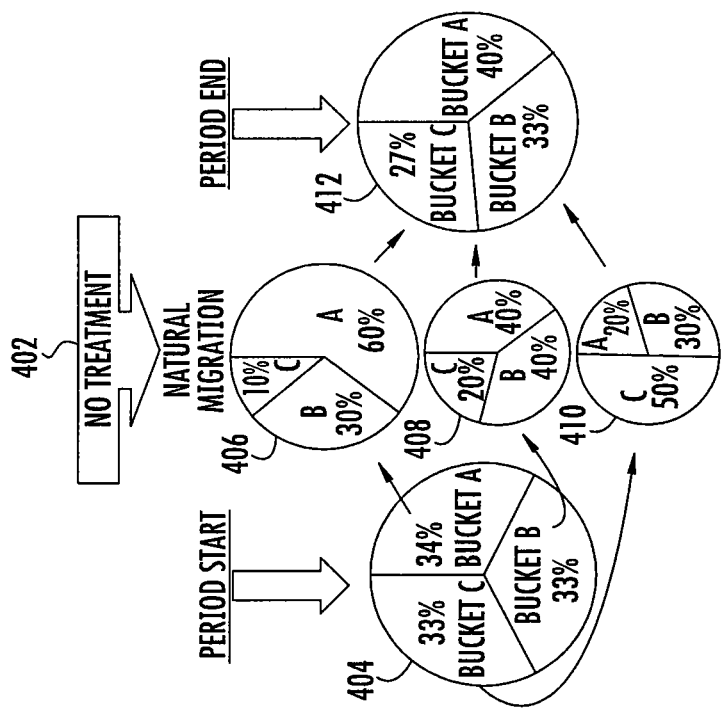
FIG. 4

700

INPUT ACCOUNTS
VOLUME DISTRIBUTION OF ACCOUNTS STUDIED
(AS OF T0 OF THE STUDY)

702

| | |
|---|---:|
| CURRENT | 2,067,812 |
| 30DPD | 182,608 |
| 60DPD | 59,645 |
| 90 DPD | 36,133 |
| 120 DPD | 27,432 |
| 150 DPD | 23,106 |
| 180+DPD | 27,992 |
| INACTIVE | 6,034,437 |
| TOTAL | 8,459,165 |
| TOTAL OUTSTANDING BALANCE T0: | $13,497,667,504 |

TREATMENT IMPACT ASSUMPTIONS
TREATMENT OR NO TREATMENT? (SELECT FOR YEAR 2 TO 5)

| YEAR 1 | YEAR 2 | YEAR 3 | YEAR 4 | YEAR 5 |
|---|---|---|---|---|
| YES | NO | NO | NO | NO |

| | |
|---|---:|
| TREATMENT INCENTIVE PER MONTH | $25 |

OFFER ACCEPTANCE RATE

704

| GO-TO-STATUS | ACCEPTANCE RATE |
|---|---:|
| CURRENT | 100% |
| 30DPD | 15% |
| 60DPD | 10% |
| 90 DPD | 8% |
| 120 DPD | 5% |
| 150 DPD | 5% |
| 180+DPD | 3% |
| ATTRITION | 0% |
| CHARGE OFF | 3% |
| INACTIVE | 0% |

OFFER REDEMPTION RATE

| GO-TO-STATUS | REDEMPTION RATE |
|---|---:|
| CURRENT | 10% |
| 30DPD | 20% |
| 60DPD | 30% |
| 90 DPD | 40% |
| 120 DPD | 50% |
| 150 DPD | 60% |
| 180+DPD | 70% |
| ATTRITION | 80% |
| CHARGE OFF | 80% |
| INACTIVE | 80% |

| | |
|---|---:|
| FALL-BACK RATE (WHEN TREATMENT STOPS) | 50% |
| AVERAGE AMOUNT PER CHARGE-OFF | $7,191 |

FIG. 7A

FROM FIG. 7B

LATENESS MIGRATION MODEL

FIELD

In general, embodiments of the invention relate to systems, methods, and computer program products for modeling the migration of populations across a segmented portfolio and/or portfolio migration-affecting programs and treatments; for example, embodiments of the invention relate to systems, methods, and computer program products for forecasting the lateness profile of a lending portfolio over several periods and for evaluating treatment programs designed to manage lateness and improve collections.

BACKGROUND

A bank is a financial institution often licensed by a government and having primary activities in borrowing and lending. Traditionally, banks have acted as payment agents, maintaining transactional accounts, more commonly known as deposit or lending accounts, for customers. To that end, banks frequently engage in the practice of lending. Lending is the provision of resources, such as the granting of a loan, by one party to another party where the second party does not immediately reimburse the first party, thereby generating a debt. Instead, the second party arranges to either repay the debt or return the resources at a later time, with interest. The interest helps to ensure that a lender will recover the initial loan amount along with a profit to cover costs and make the transaction reasonable for both parties. Along with credit unions and other money lenders, banks are often willing to extend a line of credit to individual customers and businesses in various forms that can include cash credits, term loans, demand loans, and any other similar lending relationship.

Along with payments for interest, typically, the lender will cap the amount of lending available to a particular borrower. This cap is referred to as a lending limit. A lending limit is the maximum amount of lending that a financial institution or other lender will extend to a debtor for a particular lending account. The lending limit attempts to ensure that a particular borrower will not over-borrow, thereby limiting the risk that the borrowed amount and interest owed will not be repaid by the borrower.

Lending can be lucrative for financial institutions. At times, however, predicting which borrowers are safe and which are risky is difficult. Lenders must accurately predict which percentage of lending accounts will not be paid in order to predict cash flow and prevent significant loss to the lender. Two of the most important aspects of lending that must be predicted are lateness and charge-offs, which are both forms of bad debt. Late accounts are those to which lending has been extended but not repaid on time. Charge-offs, on the other hand, are accounts that are irreparably damaged and are terminated by the lender to avoid further loss.

Forecasting losses due to anticipated bad debt is crucial to lenders as it serves some principle functions. First, accurate forecasting sets apart and declares accurate provisions for anticipated losses as part of statutory reporting guidelines. Second, forecasting aids the development of strategies and actions to manage lateness and improve collections and recovery. As a result, lateness and charge-off forecasting has become a key portfolio management activity.

One of the established techniques for loss forecasting is roll-rate-based forecasting. Currently, most financial institutions employ one of two types of lateness forecasting. The first method is known as a "multi-stage, one period" approach. This approach, which tracks the changes in the lateness profile of a portfolio from one period to the next, is useful in predicting the lateness profile only to the next period. The second method, which tracks a single account as it moves from one particular lateness stage across progressively worse lateness stages, is known as a "one stage, multi-period" approach. This method is able to track the change for one account from one lateness stage into other stages across multiple periods.

Unfortunately, these methods and others like them only allow for tracking changes from one period to the next or tracking a single account from a particular lateness stage to progressively worse lateness stages. In addition to tracking account migration simplistically, the typical roll-rate-based loss forecasting does not account for treatments. A treatment occurs when the lender provides an incentive to the borrower to make payments. Generally, a treatment strategy results in improving lateness amongst those who receive the treatment. In order to differentiate between accounts receiving treatments and those who do not, treatment accounts are referred to as "test" cases, while those accounts not receiving treatments are called "base" cases.

Therefore, systems and methods are needed that provide for improved lateness forecasting and lateness treatment analysis.

BRIEF SUMMARY

The systems and methods provided by embodiments of the present invention allow for improved lateness forecasting and/or lateness treatment analysis by, among other things, being able to forecast the size of each lateness stage across several periods (i.e., by providing a multi-stage, multi-period forecasting model).

In general, embodiments of the invention relate to systems, methods, and computer program products for predicting population migration and analyzing migration-affecting programs. For example, an apparatus is provided having a memory device with population information and a plurality of migration factors stored therein. The population information includes information about population distribution across a plurality of classifications. Each of the plurality of migration factors corresponds to a particular classification of the plurality of classifications and indicates how population members of the particular classification migrate to other classifications over a particular time period. The apparatus also includes a processor communicably coupled to the memory device and configured to use the migration factors and the population information to forecast changes in the population distribution across each of the plurality of classifications over multiple time periods.

In some embodiments of the apparatus, each of the plurality of migration factors is a percentage representing a percentage of population members of a particular classification that will move to a different classification or remain in the particular classification. In some embodiments, the processor is configured to multiply a total population of each of the plurality of classifications by one or more of the plurality of migration factors to determine a first forecasted population of each of the plurality of classifications after a first time period and then multiply the first forecasted population of each of the plurality of classifications by one or more of the plurality of migration factors to determine a second forecasted population of each of the plurality of classifications after a second time period.

In some embodiments of the apparatus, the population information includes information about population distribution changes over a past period of time. In some such embodiments, the processor is configured to use the information about population distribution changes over a past period of time to calculate the plurality of migration factors. In some embodiments, the apparatus includes a user output device configured to display the forecasted changes in the population distribution across each of the plurality of classifications over multiple time periods.

In some embodiments of the apparatus, the memory device includes at least one treatment factor stored therein, where the at least one treatment factor indicates how a treatment applied to the population is expected to affect migration across the classifications over the particular time period. In some such embodiments, the at least one treatment factor includes a treatment up-shift factor that represents a percentage of population members of a particular classification that will move to a different classification as a result of the treatment being applied to the population. In some embodiments, the at least one treatment factor includes a treatment fall-back factor that represents a percentage of population members of a particular classification that will move to a different classification as a result of the treatment being stopped. In some such embodiments of the apparatus, the processor is configured to: (1) use at least one of the migration factors to forecast changes in the population distribution for a particular time period if the treatment is not applied in the particular time period and was not applied in an immediately preceding time period to the particular time period; (2) use the treatment up-shift factor in conjunction with at least one of the migration factors to forecast changes in the population distribution for the particular time period if the treatment is applied in the particular time period but was not applied in the immediately preceding time period; (3) use the treatment fall-back factor in conjunction with at least one of the migration factors to forecast changes in the population distribution for the particular time period if the treatment is not applied in the particular time period but was applied in the immediately preceding time period; and (4) use the treatment fall-back factor and the treatment up-shift factor in conjunction with at least one of the migration factors to forecast changes in the population distribution for the particular time period if the treatment is applied in the particular time period and was applied in the immediately preceding time period. In some embodiments, the apparatus includes a user input device configured to receive user input specifying the at least one treatment factor.

In some embodiments of the apparatus, the population is a lending account portfolio, where the plurality of classifications is a plurality of levels of lateness, and where each of the plurality of migration factors indicates how many lending accounts of a particular lateness level will move to other lateness levels or will remain in the current lateness level over the particular time period. In other embodiments of the apparatus, the population is a lending account portfolio, where the plurality of classifications is a plurality of levels of lateness, and where each of the plurality of migration factors indicates how much money associated with a particular lateness level will move to be associated with other lateness levels or will remain associated with the current lateness level over the particular time period.

Embodiments of the invention also provide a method involving: (1) storing population information and a plurality of migration factors in a memory device, where the population information comprises information about population distribution across a plurality of classifications, and where each of the plurality of migration factors corresponds to a particular classification of the plurality of classifications and indicates how population members of the particular classification migrate to other classifications over a particular time period; and (2) using a processor to use the migration factors and the population information to forecast changes in the population distribution across each of the plurality of classifications over multiple time periods.

Embodiments of the invention also provide an apparatus having: (1) a memory device comprising a plurality of migration factors and lending account data for a plurality of lending accounts of a lender's lending portfolio, where the lending account data comprises a plurality of lateness levels and information about a number of lending accounts currently in each lateness level or an amount of money associated with a number of lending accounts currently in each lateness level, and where each of the plurality of migration factors corresponds to a particular lateness level and indicates how the number of lending accounts or the money in a particular lateness level migrates to other lateness levels over a particular time period; and (2) a processor configured to use the migration factors and the lending account data to forecast future lending portfolio distribution across each of the plurality of lateness levels over multiple time periods.

Embodiments of the invention also provide a method involving: (1) determining a current lateness level of each lending account of a lending account portfolio; (2) using the lending account portfolio to calculate a set of migration factors over the course of an initial period; (3) using a computer to apply the migration factors to the lending account portfolio to predict a future lending account portfolio; and (4) storing the future lending account portfolio in a memory device.

Embodiments of the invention also provide a computer program product having computer readable medium with computer executable program code stored therein. In some such embodiments, the computer executable program code includes: (1) a first executable portion configured to determine a current lateness level of each lending account of a lending account portfolio; (2) a second executable portion configured to use the lending account portfolio to calculate a set of migration factors over the course of an initial period; and (3) a third executable portion configured to apply the migration factors to the lending account portfolio to predict a future lending account portfolio.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
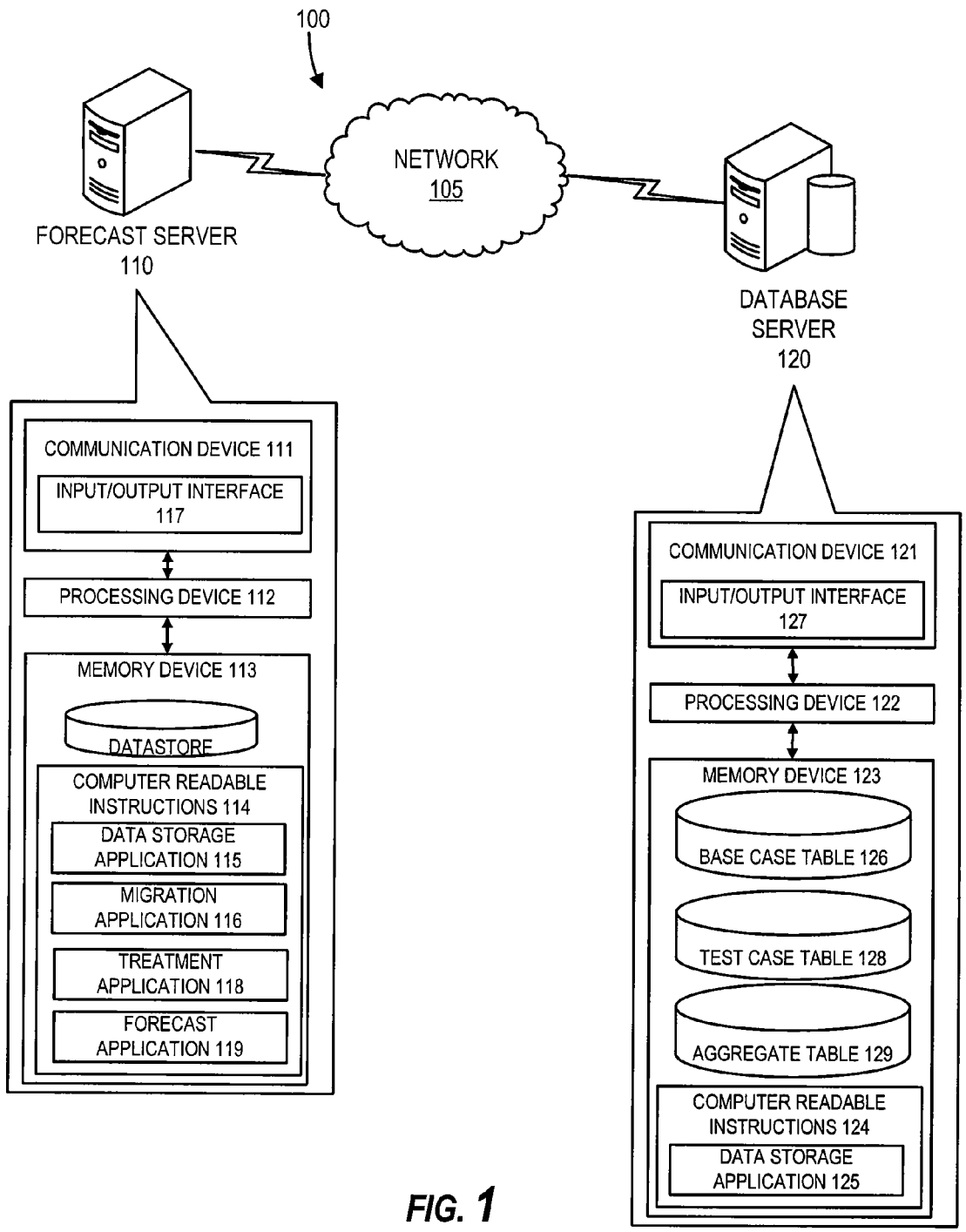
Figure 2:
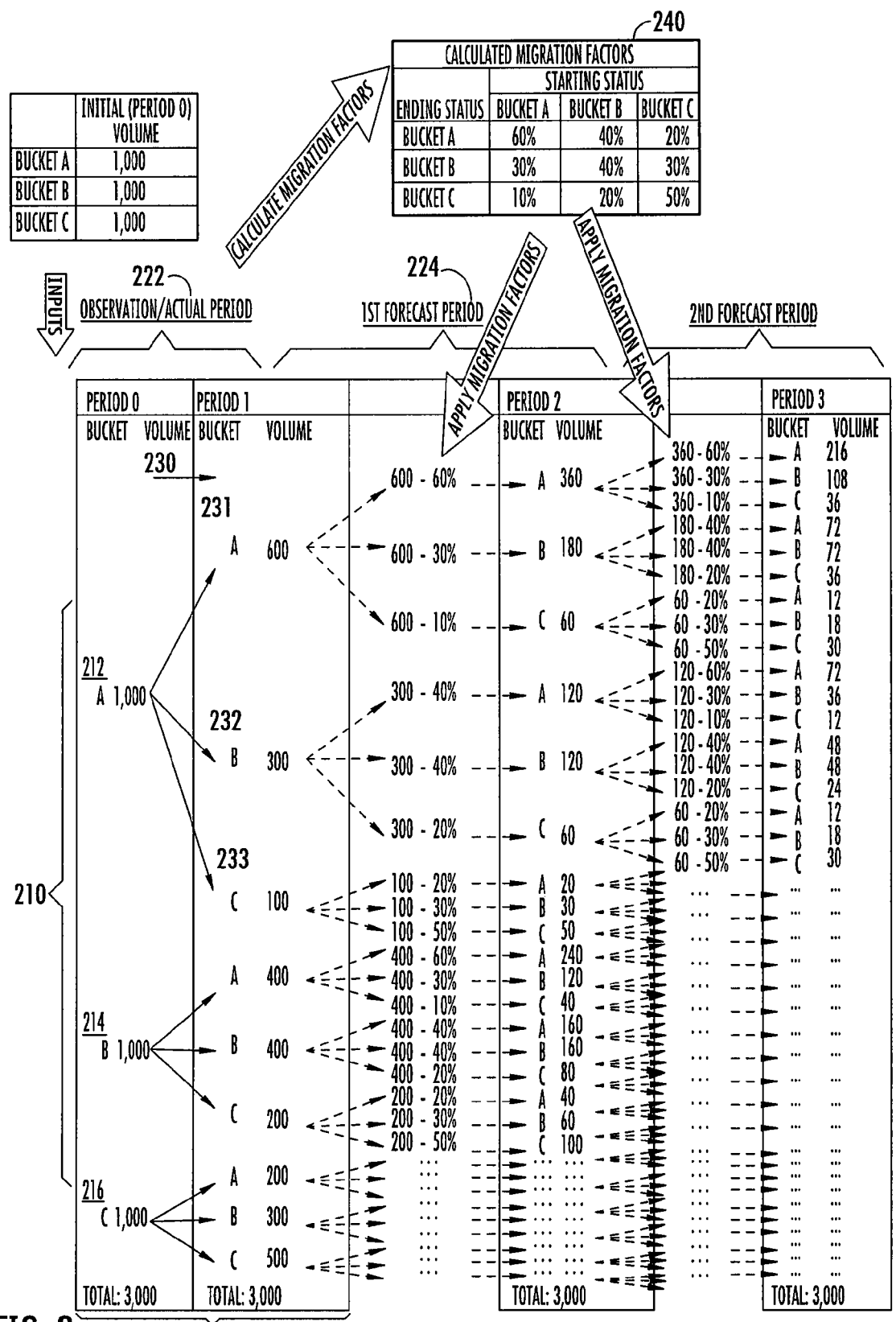
Figure 3:
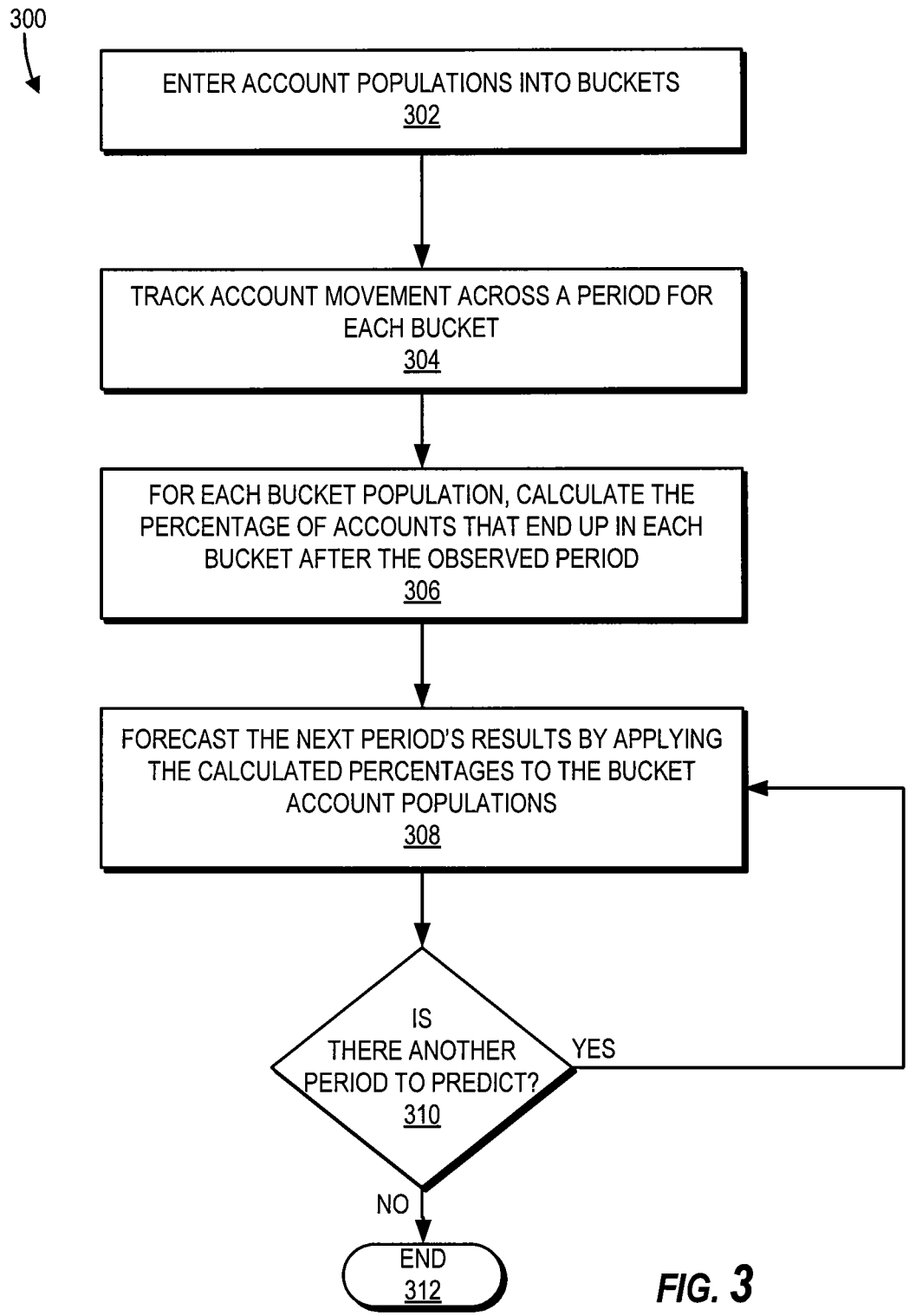
Figure 5:
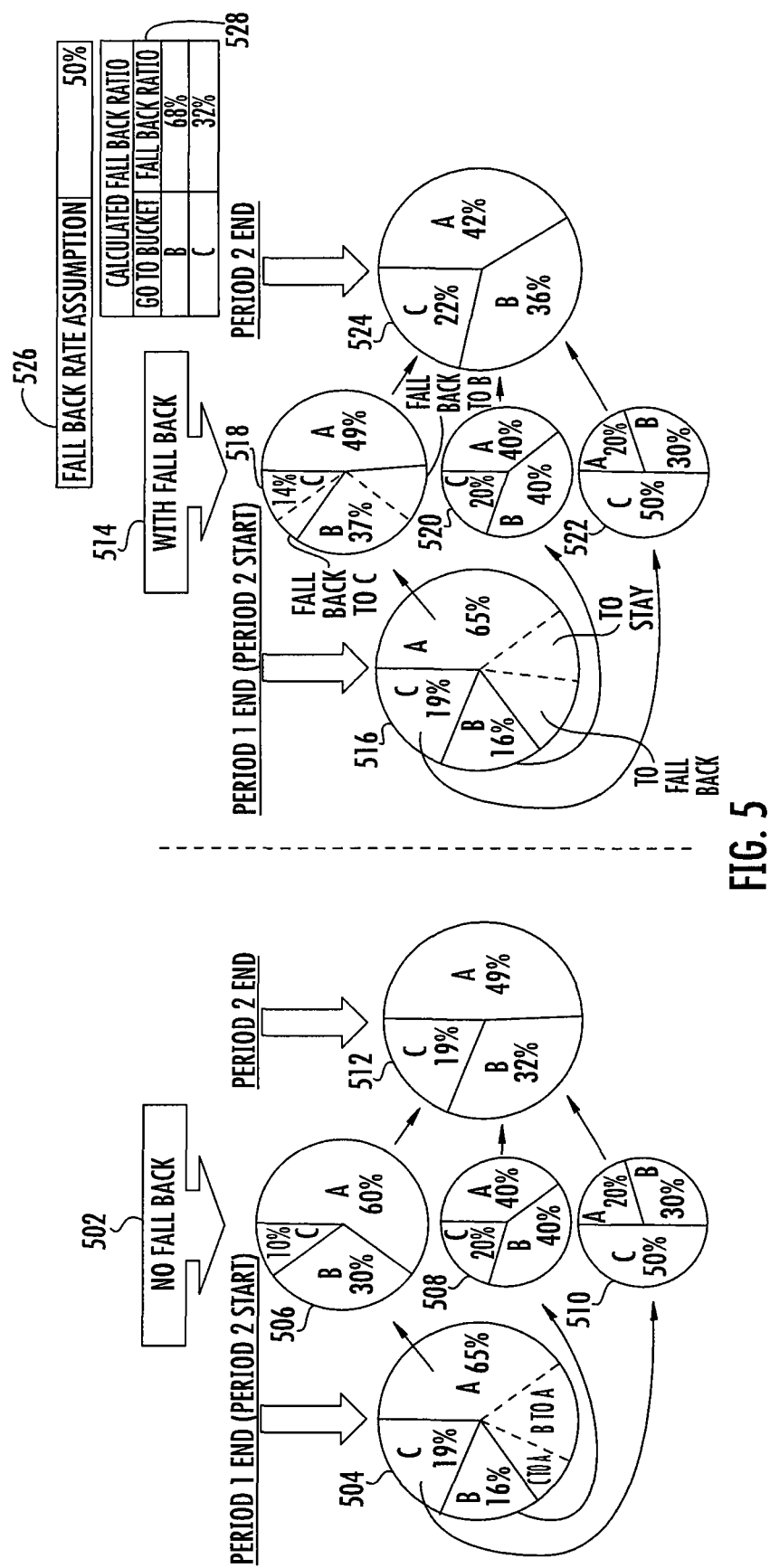
Figure 6:
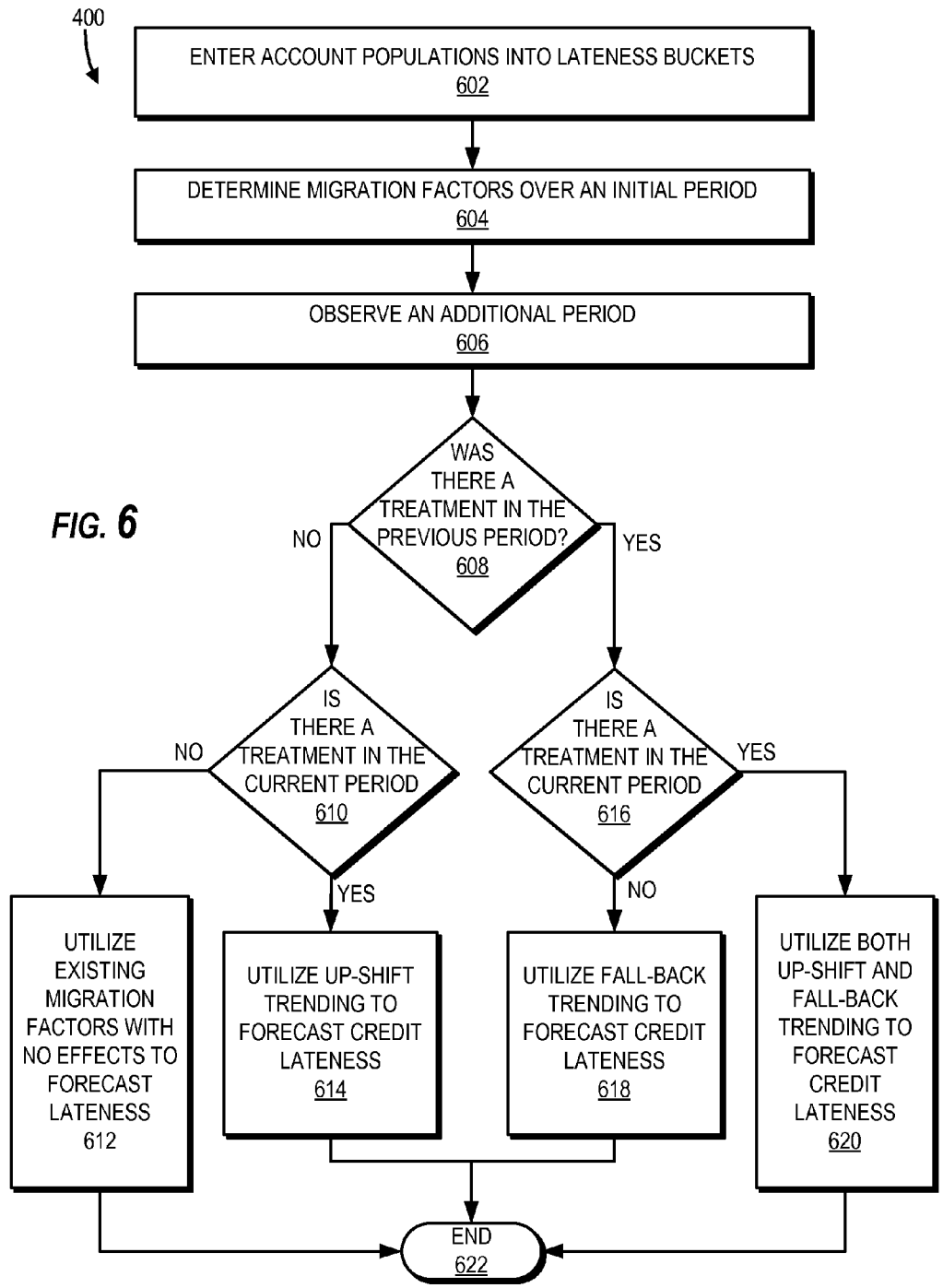

Having thus described embodiments of the invention in general terms, reference will now be made the accompanying drawings, wherein:

FIG. 1 is a functional block diagram illustrating an embodiment of the invention;

FIG. 2 is an example table illustrating lending portfolio migration, in accordance with an embodiment of the invention;

FIG. 3 is a flow diagram generally illustrating a process for calculating and utilizing migration factors to forecast lending portfolio migration, in accordance with an embodiment of the invention;

FIG. 4 is an example chart illustrating the up-shift effect on a lender's lending account portfolio following a treatment, in accordance with an embodiment of the invention;

FIG. 5 is an example chart illustrating the fall-back effect on a lender's lending account portfolio following the stoppage of a treatment, in accordance with an embodiment of the invention;

FIG. 6 is a flow diagram illustrating a process for incorporating the impact of a treatment on forecasting lending account lateness, in accordance with an embodiment of the invention; and FIGS. 7A, 7B, 7C, 7D, and 7E combine to form an example of a graphical user interface illustrating inputs and outputs of a lateness modeling tool, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Like numbers refer to like elements throughout.

As described above, it is often important for financial institutions to accurately predict losses due to late lending accounts. To that end, various aspects of the systems and methods described herein are directed toward predicting lending account losses by analyzing lending account movement among levels of lateness. In some embodiments, treatments, which are offered to prevent lending accounts from becoming late or increasingly late, are considered in the forecasting analysis.

In general, many of the example embodiments of the invention described herein are directed toward a particular implement where a financial institution identifies and predicts potential bad losses due to lending account lateness by analyzing the movement of lending accounts among various stages of lateness. The losses can be predicted in a plurality of ways, including, but not limited to, by tracking the movement (i.e., migration) of lending accounts among levels of lateness and/or by analyzing the effects of treatments on lending accounts and lending account migration. The predicted results can then be stored digitally in a database. It should be appreciated that, after the lending account movement has been forecasted and stored in a database, the database can be searched to retrieve and use the stored predictions.

Although many of the example embodiments of the invention described herein refer to a system and method for modeling the migration of lending accounts between a plurality of lateness categories over a plurality of time periods, it will be appreciated by one of ordinary skill in the art in view of this disclosure that other embodiments of the invention can be used to model other similar population changes. For example, in one embodiment of the invention, similar systems and methods can be applied to customer relationship management and used to model the migration of customers between different alternative products. In this regard, embodiments of the invention are directed generally to systems and methods for modeling the migration of a population between multiple population classifications over multiple periods of time and using the model to analyze migration-affecting programs.

Turning to FIG. 1, there is shown a block diagram illustrating an exemplary operating environment 100 of one embodiment of the invention. The operating environment 100 is only one example of a suitable operating environment and is not intended to suggest any limitation as to the scope of use or functionality of other embodiments of the present invention. Thus, other environments and configurations apparent to one of ordinary skill in the art in view of this disclosure may be employed without departing from the scope or spirit of embodiments of the present invention.

The operating environment 100 described below generally operates in a networked environment using logical connections to one or more remote computers, such as a personal computer, a server, a router, a network personal computer, and/or any other peer device. The computers will typically include most, if not all, of the elements described below in relation to computer readable medium. The logical connections could include a local area network (LAN), a wide area network (WAN), or any other wireless or wireline connection or network, such as the Internet, an intranet, and/or the like.

As shown in FIG. 1, a network 105 interconnects a forecast server 110 and a database server 120. The forecast server 110 is in communication with the database server 120 through the network 105. The forecast server 110 includes any computing device configured to perform the functions described and attributed to it herein and capable of receiving and sending information over a network, such as the network 105, to and/or from another computing device. The forecast server 110 could include one or more computing devices that connect to a network using a wired or wireless communication medium at one or more fixed locations. For example, the forecast server 110 could include a device such as a personal computer (PC), a laptop computer, a multiprocessor system, a microprocessor-based or programmable consumer electronic, a network PC, a workstation, and/or the like.

The forecast server 110 generally includes a communication device 111, a processing device 112, and a memory device 113. The processing device 112 is operatively coupled to the communication device 111 and the memory device 113. As used herein, the term "processing device" generally includes circuitry used for implementing the communication and/or logic functions of a particular system. For example, a processing device 112 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 112 may include functionality to operate one or more software programs based on computer-executable program code thereof, which may be stored in the memory device 113. As used herein, a "memory device" or simply "memory" refers to a device including one or more forms of computer-readable media as defined hereinbelow.

The processing device 112 uses the communication device 111 to communicate with the network 105, and other devices on the network 105, including but not limited to the database server 120. As used herein, a "communication device," such as communication device 111, generally includes a modem, server, and/or other device for communicating with other devices on the network 105, and/or a display, mouse, keyboard, touchpad, touch screen, microphone, speaker, and/or other user input/output device for communicating with one or more users.

In this regard, in the illustrated embodiment, the communication device 111 includes an input/output interface 117. The input/output interface 117 includes input and output devices relating to the forecast server 110. A user may enter commands and information into the forecast server 110 through input devices such as a tablet, an electronic digitizer, a microphone, a keyboard, a pointing device such as a mouse, a trackball, a touch pad, or the like. The forecast server 110 may communicate with the user as the input/output interface 117 also includes output devices such as, but not limited to, a display monitor, speakers, a printer, or the like. In some embodiments, the input/output interface 117 includes a graphical user interface displayed on a display device of or coupled to the forecast server 110.

The forecast server 110 further includes computer-readable program instructions stored in the memory device 113, which includes the computer-readable instructions of a data storage application 115, a migration application 116, a treatment application 118, and a forecast application 119. The data storage application 115 is used to store data, such as financial account data, transaction history, or any other information transferable over the network 105. Alternatively or additionally, the data storage application 115 is used to store data entered by a user through the input/output interface 117. The migration application 116 generally tracks lending account movement and calculates migration factors. The forecast application 119 generally predicts account losses based on the data gathered by the other applications. The treatment application 118 generally tracks how treatments affect lending accounts. All of these applications and the processes performed thereby are discussed more completely below.

The migration application 116, as stated above, tracks lending account movement and calculates migration factors. As used herein, "migration factors" represent the likelihood that a given lending account will migrate from one level of lateness to another over the course of a set period of time. For example, in one embodiment of the invention, a migration factor represents the percentage of accounts or money that will move from one stage of lateness to another over the course of a month. Periods can range from relatively short terms, such as a day, week, or month, to longer terms, such a quarter, multiple quarters, a year, or multiple years. The migration application 116 is capable of analyzing the movement found in a particular lending account portfolio over some past period of time and determining the migration factors found within specified levels of lateness during that period of time.

The treatment application 118 acts in a similar manner to the migration application 116 in that the treatment application 118 will track the migration of accounts being treated and calculate a corresponding migration factor in relation to these treated accounts, which are also known as "test" cases. In one example embodiment of the invention, treatments are instances when a lender offers a borrower an incentive, or takes other action, to improve the borrower's lending account lateness classification. In some cases, an offered treatment must be accepted and redeemed by the borrower. In one embodiment, an offer is redeemed when a borrower fulfills the minimum requirements of the treatment. For example, in one embodiment, the treatment is an incentive that the user only receives if the user makes certain minimum payments.

As discussed more completely below, when a treatment is applied to various lending accounts, a section of the lending account population that is likely to roll into worse lateness stages might, instead, improve (i.e., move towards being "current"). This is called "up-shift." Similarly, when an ongoing treatment strategy is stopped, some of those accounts that followed the "up-shift" trend are likely to "fall-back" to higher stages of lateness. Thus, the impact of a treatment on a lateness profile of the portfolio is captured and over-laid on top of the base roll-rate migration factors. The primary metric that can be used to measure the "lift" from a treatment is the total reduction of accounts that are "charged off," in terms of incidence and/or dollar value. Other secondary metrics that can also be tracked are the reduction in number of accounts in the various lateness stages. However, while estimating the net benefit of a treatment, the cost of applying the treatment should also be considered and factored into the prediction model.

The forecast application 119 uses information gathered from the migration application 117 and the treatment application 118 to generate lateness predictions for the lending account portfolio of a financial institution. As will be described more completely below, the forecast application 119 can access the migration application 117 to retrieve migration factor data. The forecast application 119 can then access the treatment application 118 to retrieve data related to the occurrence rate and the effect of treatments on lending accounts. Using this data, the forecast application 119 is configured to forecast potential losses among a financial institution's lending account portfolio.

Although FIG. 1 illustrates the forecast server 110 as one system, it should be noted that there can be one or multiple systems with one or multiple applications, each with similar components that handle a number of functions related to forecasting activity or other forecast systems. It should also be noted that each of the multiple systems can be in communication with each other through the network 105 and in communication with the database server 120 and/or other devices connected to the network 105. Likewise, although FIG. 1 illustrates the forecast server 110 being separate from the database server 120, in other embodiments the separation is conceptual only and the two servers are combined into a single server or other computing device or otherwise share one or more pieces of hardware and/or software.

The database server 120 generally includes a communication device 121, a processing device 122, and a memory device 123. The processing device 122 is operatively coupled to the communication device 121 and the memory device 123. The processing device 122 uses the communication device 121 to communicate with the network 105 and other devices on the network, including but not limited to, the forecast server 110. As such, the communication device 121 generally comprises a modem, server, or other device for communicating with other devices on the network 105.

Additionally, the communication device 121 includes an input/output interface 127. The input/output interface 127 includes input and output devices relating to the database server 120. A user may enter commands and information into the database server 120 through input devices such as a tablet, an electronic digitizer, a microphone, a keyboard, a pointing device such as a mouse, a trackball, a touch pad, or the like. The database server 120 may also communicate with the user as the input/output interface 127 includes output devices such as, but not limited to, a display monitor, speakers, a printer, or the like.

The database server 120 further includes computer-readable program instructions stored in the memory device 123, which includes the computer-readable instructions of a data storage application 125. The data storage application 125 is used to store data captured from any of the communication methods recognized by the communication device 121, the data including late payment information, missed payment information, transaction history, or data entered by a user through the input/output interface 127.

The data storage application 125 retains data of a variety of types, but most importantly, the application retains data tables or other datastores comprised of data representing lending account activity. The database server 120 comprises multiple tables, including a base case table 126, which houses lending account information related to accounts not receiving treatments, a test case table 128, which houses lending account information related to accounts receiving treatments, and an aggregate table 129, which houses the combined lending account information of the base and test case tables as well as lending account forecasting information. In one embodiment, each table is arranged in matrix form wherein the available lending account information is broken into combinations of information meant to represent the lending account. For example, the tables include payment information for each account, such as when the last payment was received, due dates, days a payment is past due, lateness history, payment history, payment amounts, and/or the like. The tables also include account balance information, such as current account balance, statement balance, balance history, lending limit, available lending limit, and/or the like. Also included, in some embodiments, is data tending to show the potential for default related to each account.

Turning to FIG. 2, the lending account movement exemplified by FIG. 2 in conjunction with the flow diagram of FIG. 3 illustrates the concept of migration as it pertains to the migration application 116 shown in FIG. 1. As described below, a lending card account can be in one of a variety of lateness stages, ranging from "current" to "charge off." In the illustrated embodiment, the stages are broken into thirty-day windows called lateness buckets. For example, in such an embodiment, one lateness bucket contains every lending card account that is between one and thirty days past due, and another lateness bucket contains every lending card account that is between thirty and sixty days past due. In this way, the entire lending card portfolio of a bank can be segmented based on these lateness stages to arrive at the lateness profile of the bank's portfolio. Accounts migrate from one lateness stage to another (i.e. the accounts move between buckets) and the lateness profile changes from one stage to the next.

FIG. 2 depicts an example table 200, while process 300 of FIG. 3 illustrates an example of calculating and utilizing migration factors. Turning to FIG. 2, the example table 200 is comprised of buckets 210 and periods 220. As previously described, the buckets 210 represent the lateness status of the lending accounts. As shown in FIG. 2, the buckets 210 comprise an "A" bucket 212, a "B" bucket 214, and a "C" bucket 216, which represent different levels of lateness. Process 300 of FIG. 3 begins with the step represented by process block 302 where account populations are entered into the buckets. Returning to FIG. 2, example table 200 illustrates that the "A" bucket 212, the "B" bucket 214, and the "C" bucket 216 each begin with one thousand lending accounts in their respective account populations. For example, in one embodiment, the "A" bucket 212 may represent those active accounts that are current on their payments, the "B" bucket 214 may represent those active accounts that have a payment between thirty and sixty days past due, and the "C" bucket 216 may represent those active accounts that have a payment between sixty and ninety days past due.

After the account populations are determined, process 300 moves to block 304 where the lending account populations for each bucket are tracked across a period. Returning to FIG. 2, the periods 220 represent set periods of time during which account movement is observed and measured. The periods shown in FIG. 2 include the observation period 222, the first forecast period 224, and the second forecast period 226.

As previously noted, in this example, each of buckets "A" 212, "B" 214, and "C" 216 began with one-thousand accounts at the start of the observation period 222. Over the course of the observation period 222, however, the accounts migrate as shown in the migration 230. For example, only six-hundred of the accounts that originate in the "A" bucket 212 stay in the "A" bucket 212 by the end of the observation period 222. Three-hundred of the one-thousand original accounts that begin in the "A" bucket 212 wind up in the "B" bucket at the end of the observation period 222, while one-hundred wind up in the "C" bucket. Similar migration, although at different rates, is evident in regards to the account populations originating in the "B" bucket 214 and the "C" bucket 216. Once this movement has been observed, process 300 moves to block 306.

Process block 306 of FIG. 3 describes the step of calculating, for each lateness bucket, the distribution of lending accounts as a percentage. As described above in regard to the example illustrated in FIG. 2, six-hundred of the original one-thousand accounts that began in the "A" bucket 212, finish in the "A" bucket 212. This means that an account beginning in the "A" bucket 212, has a 60% chance of remaining in the "A" bucket 212 over the course of a single period 220. In this case, 60% represents the migration factor for a lending account beginning and ending in the "A" bucket 212. Similar calculations can be made for each beginning and ending bucket distribution, and therefore, migration factors can be calculated for each possibility. Accordingly, the factors calculated for each of the buckets 210 are represented in the migration factor table 240. The migration factor table 240 displays the projected status for each lending account beginning in the buckets 210 in future periods 220. In the illustrated example, the migration factors 240 show that, for lending accounts beginning in the "A" bucket 212 at the start of a period, 60% will remain in the "A" bucket 212 at the end of the period, 30% will be in the "B" bucket 214 at the end of the period, and 10% will be in the "C" bucket 216 at the end of the period. For lending accounts beginning in the "B" bucket 214, 40% will move up to the "A" bucket 212 before the end of the period, 40% will remain in the bucket 214 at the end of the period, and 20% will move down to the "C" bucket 216 before the end of the period. For lending accounts beginning in the "C" bucket 216, 20% will move up to the "A" bucket 212 before the end of the period, 30% will move up to the "B" bucket 214 before the end of the period, and 50% will remain in the "C" bucket 216 at the end of the period.

Returning to FIG. 3, after the migration factors have been calculated in process block 306 based on the observed migration during the observation period, process 300 proceeds to block 308 where lateness forecasting occurs. During this step, the migration factors are applied to the bucket populations in order to predict the movement of lending accounts among lateness buckets. As illustrated in FIG. 2, the migration factor table 240 shows that 60% of the accounts beginning in the "A" bucket 212 will remain in the "A" bucket 212 after a given period. In process block 308, each calculated migration factor is applied to its corresponding lateness bucket. By applying the migration factor values shown in the migration factor table 240 to each lateness bucket population before a given period, a financial institution can accurately predict lateness bucket populations at the end of the given period.

Once forecasting is completed in process block 308, process 300 moves to decision block 310. As illustrated by block 310 a decision is made as to whether there is another period to forecast. If there is, then process 300 returns to block 308 where forecasting is done. If, however, there is not another period to forecast, then the process 300 ends at block 312.

For example, as illustrated in FIG. 2, in this example migration there are nine buckets at the end of the observation period 222: one "A" bucket of accounts formerly in an "A" bucket; one "B" bucket of accounts formerly in an "A" bucket; one "C" bucket of accounts formerly in an "A" bucket; one "A" bucket of accounts formerly in a "B" bucket; one "B" bucket of accounts formerly in a "B" bucket; one "C" bucket of accounts formerly in a "B" bucket; one "A" bucket of accounts formerly in a "C" bucket; one "B" bucket of accounts formerly in a "C" bucket; and one "C" bucket of accounts formerly in a "C" bucket. The migration factors from table 240 are then applied to these nine buckets to forecast the lateness distribution at the end of the first forecast period 224. For example, in the exemplary embodiment illustrated in FIG. 2, each of these nine buckets then migrates into three buckets at the end of the first forecast period 224, resulting in a total of twenty-seven buckets. In the illustrated embodiment, the migration factors 240 are then applied to these twenty-seven buckets to forecast the lateness distribution at the end of a second forecast period, resulting in eighty-one buckets. This process continues until the user has forecasted out as far as the user is interested in forecasting.

The forecast period is some length of time equal to the length of time on which the migration factors 240 are based. For example, in one embodiment, the migration factors 240 show what percentage of accounts from each bucket will remain in the bucket or migrate to another bucket after a month. In such an embodiment, the first forecast period 224 is one month after the end of the observation period 222 and the second forecast period is one month after the end of the first forecast period 224, and so on. In other embodiments, each forecast period is a day, a week, two weeks, half a month, month, two months, three months, four months, six months, year, five years, decade, or any other length of time. In some embodiments, the length of time of each forecast period is equal to the length of time of the observation period 222.

As the process is described in FIG. 2 and FIG. 3, the number of lateness buckets will continue to increase exponentially and the computational complexity will increase with each progressing forecast period. It should be noted that, although bucket distributions can be broken down into progressively smaller samples during forecasting as described above with reference to FIG. 2, in one embodiment, the bucket totals are aggregated at the end of each period. Aggregation reduces the complexity of the computation. More particularly, at the end of each period, all of the lending accounts that flow into one lateness stage (i.e. each bucket) are aggregated irrespective of the initial lateness bucket from which the lending account originated. As a result, the lending account population can be viewed in terms of the original lateness stage buckets, rather than increasingly more complex sub-bucket groups.

For example, as described above with reference to FIG. 2, in the illustrated example, at the end of the observation period 222 there are nine buckets: one "A" bucket of six-hundred accounts formerly in an "A" bucket; one "B" bucket of three-hundred accounts formerly in an "A" bucket; one "C" bucket of one-hundred accounts formerly in an "A" bucket; one "A" bucket of four-hundred accounts formerly in a "B" bucket; one "B" bucket of four-hundred accounts formerly in a "B" bucket; one "C" bucket of two-hundred accounts formerly in a "B" bucket; one "A" bucket of two-hundred accounts formerly in a "C" bucket; one "B" bucket of three-hundred accounts formerly in a "C" bucket; and one "C" bucket of five-hundred accounts formerly in a "C" bucket. In one embodiment, the three "A" buckets at the end of the observation period are aggregated to form a single "A" bucket of one-thousand two-hundred accounts. Likewise, the three "B" buckets at the end of the observation period are aggregated to form a single "B" bucket of one-thousand accounts, and the three "C" buckets at the end of the observation period are aggregated to form a single "C" bucket of eight-hundred accounts. The migration factors 240 are then applied to these buckets to forecast the lateness distribution of the portfolio after one forecast period 224. In the illustrated embodiment, after aggregation, the model forecasts that there will be one-thousand two-hundred and eighty accounts in the "A" bucket, one-thousand accounts in the "B" bucket, and seven-hundred and twenty accounts in the "C" bucket.

Turning to FIG. 4, the natural migration 402 and the up-shift migration 414 illustrate the up-shift effect on lending account lateness following a treatment. The natural migration 402 is an alternate representation of the migration described by FIG. 2 and FIG. 3. The natural migration 402 utilizes the same migration factors applied in FIG. 2, as is illustrated by the natural migration pies between the origination pie 404 and the natural aggregation pie 412. The origination pie 404 reintroduces the "A" bucket, where lending accounts are current, the "B" bucket, where lending accounts are between thirty and sixty days past due on payments, and the "C" bucket, where lending accounts have a payment that is between sixty and ninety days past due. As before, the buckets represent segments of the overall lending account portfolio that are in different stages of lateness. Initially, the lending accounts are divided equally among the buckets for the purposes of this example.

The "A" migration pie 406 illustrates that 60% of the accounts originating in the "A" bucket of the origination pie 404 will remain in the "A" bucket upon completion of one period, whereas 30% will end up in the "B" bucket and 10% will end the period in the "C" bucket. The "B" migration pie 408 and the "C" migration pie 410 represent similar movement. As shown in the "B" migration pie 408, an account that is initially found in the "B" bucket of the origination pie 404 has a 40% probability of migrating to the "A" bucket, a 40% probability of remaining in the "B" bucket, and a 20% probability of migrating to the "C" bucket after one period. Similarly, as illustrated in the "C" migration pie 410, an account that is initially located in the "C" bucket has a 20% probability of migrating to the "A" bucket, a 30% probability of migrating to the "B" bucket, and a 50% probability of remaining in the "C" bucket after one period. The natural aggregation pie 412 illustrates that when the migration factors are applied to the origination pie 404, 40% of all lending accounts will end up in the "A" bucket, 33% will end up in the "B" bucket, and 27% will end up in the "C" bucket at the close of a single period.

In contrast to the natural migration 402, the up-shift migration 414 illustrates the movement of accounts across a single period when a treatment for improving lateness rates is applied to the lending accounts owned by the lender (referred to herein as an "up-shift"). As previously discussed, treatments are applied after a treatment has been offered, accepted, and redeemed. As described above, the offer, acceptance, and redemption of a treatment enables a poor lateness lending account to shift upward from a worse lateness status to a better lateness status. The completion rate table 426 illustrates the percentage likelihood that a given account will shift into a better lateness stage upon completion of a treatment period. As shown in the completion rate table 426, a lending account beginning in the "A" bucket and engaging in the treatment has a 100% probability of remaining in the "A" bucket, a lending account beginning in the "B" bucket and engaging in the treatment has a 50% probability of migrating to the "A" bucket (e.g., becoming current), and a lending account beginning in the "C" bucket and also completing a treatment has a 30% probability of migrating to the "A" bucket (e.g., becoming current). These percentages represent the treatment factors.

Similarly to origination pie 404, the pre-treatment portfolio pie 416 illustrates the distribution of the entire lending account portfolio among lateness buckets at the start of a period. As before, the lending account portfolio is divided equally among the three example lateness buckets. In order to forecast the effect of a treatment on a given lateness bucket, the completion rates from the completion rate table 426 are applied in conjunction with the standard migration factors. This is illustrated by the change in the distribution of the lateness buckets from the pretreatment portfolio pie 416 to the "A" treatment migration pie 418, the "B" treatment migration pie 420, and the "C" treatment migration pie 422 when compared to the movement illustrated by the standard migration 402. When compared to the "A" migration pie 406, the "A" treatment migration pie 418 illustrates how lending account lateness can be improved when treatments are applied. As with the "A" migration pie 406, the migration factors are applied to the pre-treatment portfolio pie 416. After these factors are applied, 60% of the accounts originating in the "A" bucket of the pretreatment portfolio pie 416 will remain in the "A" bucket upon completion of one period, whereas 30% will end up in the "B" bucket and 10% will end the period in the "C" bucket. After this initial application, however, the treatment factors of the treatment factor table 426 are applied. As illustrated by the labeled regions of the "A" treatment migration pie 418, 50% of the accounts that would have migrated to the "B" bucket from the "A" bucket during the period, will remain in the "A" bucket. Similarly, 30% of the accounts that would have migrated to the "C" bucket from the "A" bucket will also remain in the "A" bucket. As illustrated, these accounts benefit significantly from the applied treatment.

The treatment factors are applied in the same way to those lending accounts originating in the "B" bucket and the "C" bucket. As shown in the "B" treatment bucket 420, 50% of the accounts that would have stayed in the "B" bucket following the period will instead migrate to the "A" bucket after application of the treatment. Likewise, 30% of the accounts that would have migrated to the "C" bucket migrate to the "A" bucket instead. As shown in the "C" treatment bucket 422, 50% of the accounts that would have migrated to the "B" bucket following the period will instead migrate to the "A" bucket after application of the treatment, and 30% of the accounts that would have remained in the "C" bucket will migrate to the "A" bucket instead.

Finally, the up-shift aggregation pie 424 illustrates the lending account portfolio after a treatment has been applied during one period. The up-shift aggregation pie 424 shows that, after a period during which a treatment is applied, the "A" bucket will contain 65% of the lending accounts, the "B" bucket will contain 16% of the lending accounts, and the "C" bucket will contain 19% of the lending accounts. The up-shift aggregation pie 424 also illustrates the accounts that would have been in the worse lateness buckets by shading the pie pieces that would have migrated to poor lateness buckets during the period if not for completion of the treatment. As evidenced by the up-shift aggregation pie 424 in comparison to the natural aggregation pie 412, the positive effects of a treatment can, in some cases, be substantial and can be modeled and forecasted using the above-described technique.

Turning now to FIG. 5, the second natural migration 502 and the fall-back migration 514 illustrate the fall-back effect on lending account lateness following the stoppage of a treatment. FIG. 5 begins with the distribution totals achieved after the treatment that was applied in FIG. 4. As such, the second origination pie 504 exactly mirrors the up-shift aggregation pie 424 from FIG. 4, wherein the "A" bucket contains 65% of the lending account population, the "B" bucket contains 16% of the lending account population, and the "C" bucket contains 19% of the lending account population. The labeled regions of the second origination pie 504 represent the lending accounts that would have been in worse lateness buckets if not for the treatment. Similarly, the second natural migration 502 follows the same migration pattern as the natural migration 402 from FIG. 4. As such, the second natural migration 502 does not employ either an up-shift or a fall back. Instead, the second natural migration 502 applies the standard migration factors described in previous examples and is used to illustrate the difference between a natural migration and a migration in which fall-back occurs.

Using the standard migration factors, the "A" migration pie 506 illustrates that 60% of the accounts originating in the "A" bucket of the post-treatment origination pie 504 will remain in the "A" bucket upon completion of one period, whereas 30% will end up in the "B" bucket and 10% will end the period in the "C" bucket. The "B" migration pie 508 and the "C" migration pie 510 represent similar movement. As shown in the "B" migration pie 508, an account that is initially found in the "B" bucket of the second origination pie 504 is 40% likely to migrate to the "A" bucket, 40% likely to remain in the "B" bucket, and 20% likely to migrate to the "C" bucket after one period. Similarly, as illustrated in the "C" migration pie 510, an account that is initially located in the "C" bucket is 20% likely to move to the "A" bucket, 30% likely to migrate to the "B" bucket, and 50% likely to remain in the "C" bucket after one period. The second natural aggregation pie 512 illustrates that by following natural migration, the migration factors applied to the other pies will result in 49% of all lending accounts ending up in the "A" bucket, 32% ending up in the "B" bucket, and 19% ending up in the "C" bucket following a single period.

In contrast to the second natural migration 502, the fall-back migration 514 illustrates the movement of accounts across a single period when treatments are stopped following the previous period. As described previously, when a treatment is stopped, lending accounts have a tendency to fallback into higher lateness buckets. This concept is known as fall-back. The fall-back rate assumption 426 illustrates the percentage likelihood that a lending account that has benefitted from an up-shift due to a treatment will shift into a worse lateness stage after a treatment has stopped. For purposes of this example, it is assumed that the fall-back rate assumption 526 is 50%. In actual computations, however, the fall-back rate is calculated in much the same way migration factors are calculated. A lender or other subject matter experts may calculate this figure by observing the migration of treated accounts after similar treatments have been stopped in previous periods. The fall-back ratio table 528 illustrates the projected post-treatment destination of lending accounts that have been treated. As shown in the fallback ratio table 528, of the lending accounts that are expected to fall-back as a result of stoppage of the treatment, 68% of these are likely to fall-back to the "B" bucket and 32% are likely fall-back to the "C" bucket after a treatment has been stopped. In other words, the fall-back assumption rate 526 and the fall-back ratio table 528 are used in tandem to forecast the effect of fall-back on a given lending account population.

The pie progression displayed in the fall-back migration 514 of FIG. 5 illustrates the concept of fall-back. The post-treatment portfolio pie 516 substantially mirrors the second origination pie 504 with one major distinction. As before, the labeled regions (the regions labeled "to fall back" and "to stay") of the post-treatment portfolio pie 516 represent the accounts that benefitted from the treatment and are current (i.e., in the "A" bucket) as a result of the treatment. In the post-treatment portfolio pie 516, however, the fall-back assumption rate 526 is used to delineate which of these treated accounts will suffer from fall-back. As the fall-back assumption rate 526 used in this example is 50%, half of the accounts that benefitted from the treatment will fall back to worse lateness buckets. As a result, one labeled region represents the accounts that will suffer fall-back, and the other labeled region represents the accounts that will retain the benefit of the treatment and remain in the "A" bucket (subject to the natural migration factors of accounts in the "A" bucket).

In the example migration illustrated by FIG. 5, the only accounts that could suffer from fall-back begin the period in the "A" bucket. As a result, the only difference between the fall-back migration 514 and a natural migration will lie within the "A" bucket migration process. The migration from the "A" bucket depicted in the posttreatment portfolio pie 516 to the post-treatment "A" migration pie 518 represents this migration and illustrates the effect of fall-back. As shown in the post-treatment portfolio pie 516, the "A" bucket retains 65% of the lending account population after a treatment period. The post-treatment portfolio pie 516 also illustrates that approximately 38% of the "A" bucket population, or 25% of the overall population, is derived from accounts that benefitted from a treatment in the previous period. By applying the fall-back assumption rate 526, we see that half of the region representing the treated accounts (12.5% of the total population in this example) will suffer fall-back and half will remain in the "A" bucket subject to the normal migration factors applied to accounts in the "A" bucket. This means that, in this example, roughly 52.5% of the "A" bucket in the post-treatment portfolio pie 516 will have the natural migration factor of 60% applied to it. The application of the migration factor results in 49% of the post-treatment "A" migration pie remaining in the "A" bucket. After the "A" bucket has been determined, the fall-back ratios from the fall-back ratio table 528 are applied to the 12.5% of the "A" bucket that will suffer fall-back. The fall-back ratios predict that 68% of those accounts that will suffer fall-back will migrate to the "B" bucket, while the remaining 32% of those accounts will migrate to the "C" bucket. These ratios mean that 68% of the accounts suffering fall-back will have worse lateness and migrate to the "B" bucket prior to the migration calculation and 32% will migrate to the "C" bucket prior to migration. After those accounts have migrated, the natural migration factors are applied and the results are illustrated in the post-treatment "A" migration pie 518, wherein 14% of the lending accounts originating in the "A" bucket of the post-treatment portfolio pie 516 will migrate to the "C" bucket and 37% will migrate to the "B" bucket.

The post-treatment "B" migration pie 520 and the post-treatment "C" migration pie 522 illustrate that lateness buckets that do not contain treated accounts will migrate naturally. The post-treatment "B" migration pie 520 shows that, as with previous natural migrations, 40% of accounts originating in the "B" bucket will migrate to the "A" bucket, 40% of the accounts originating in the "B" bucket will remain in the "B" bucket, and 20% of the lending accounts originating in the "B" bucket will migrate to the "C" bucket. Similarly, the post-treatment "C" migration pie 522 illustrates that 20% of the lending accounts originating in the "C" bucket will improve their status and migrate to the "A" bucket, 30% will migrate upward into the "B" bucket, and 50% will remain in the "C" bucket.

The fall-back aggregation pie 524 illustrates the lending account portfolio after a treatment has been stopped during a period following a treatment period. The fallback aggregation pie 524 shows that, in this example, following a period before which a treatment is stopped, the "A" bucket will contain significantly fewer lending accounts than were present at the beginning of the period, while the "B" bucket and the "C" bucket will contain significantly more lending accounts. The fall-back aggregation pie 524 effectively illustrates the effect of fall-back on lending accounts that previously benefitted from a treatment.

Referring now to FIG. 6, process 600 illustrates the forecasting of lending account lateness when treatments, such as customer incentives, are used in an attempt to reduce the poor lateness rate. Process 600 begins in block 602 where the lending account populations are entered into lateness buckets, as was described and illustrated by FIG. 2 and FIG. 3. As before, each bucket represents a different stage of lateness, often ranging from current (i.e., not late or late within some acceptable length of time) to 180 days past due (DPD) to charge-off (for example, in one embodiment, charge-off occurs after some pre-defined length of time that an account is past due, such as after an account is 180 days past due). Similarly, the lending account populations, when combined, make up the entirety of a financial institution's lending portfolio.

Process 600 then moves to block 604 where migration factors are calculated based on an initial period or several periods. This step has also been previously described with reference to FIG. 2 and FIG. 3. The period described in block 604 is observed without treatments because treatments directly influence migration factors. As such, base case migration factors are generated that are unaffected by treatments before applying treatments to lending accounts and forecasting lateness involving those treatments. In some embodiments, the migration factors are not based on historical periods or are only partially based on historical periods and are further based on educated predictions of certain subject matter experts.

As was previously described, the application or stoppage of treatment impacts the migration of accounts from one lateness stage to another. When a successful treatment is applied, a certain percentage of accounts from worse lateness buckets tend to move into better lateness buckets as a result of the treatment, thus improving the overall lateness profile of the portfolio. Conversely, however, when the treatment is stopped, at least some accounts tend to fall back from the better lateness bucket into a worse lateness bucket. Thus, portfolio status typically improves when a treatment is applied but typically worsens when a treatment is stopped. While the impact of a treatment is incorporated in the base model, it is important to consider when a treatment starts and when it is stopped. This information helps determine when and how the impact should be incorporated into multiple periods of the forecast.

Returning to FIG. 6, after base migration factors have been calculated, process 600 continues to block 606 where another period is observed. Unlike the previous process block, treatments are allowed, but not required, during this secondary period. After observing the period described in block 608, process 600 continues to decision block 608. As illustrated by block 608, a decision is made as to whether a treatment was applied in the previous period. If no treatment was applied, process 600 continues to decision block 610 where it is determined if a treatment will be applied in the current period.

If no treatment is applied in the current period, then the process 600 moves to process block 612 where existing migration factors are applied without any concern for treatments. No adjustments are made to the base forecasting model because no treatments are applied to the lending accounts. If, however, a treatment is applied in the current period, then the process 600 moves to process block 614 where up-shift trending is applied to the forecasting model. As described above, when a treatment is applied to lending accounts, a portfolio will improve (i.e. have less lateness). As a result of the treatment, an improvement will be seen among lending accounts and the improvement must be factored into the prediction model.

Returning to decision block 608, if a treatment was applied in the secondary period, process 600 continues to decision block 616. Similarly to block 610, block 616 illustrates a determination of whether a treatment is applied in the current period. If a treatment is not applied in the current period, process 600 flows to block 618 where fall-back trending is applied to the forecasting model. If a treatment was applied in the previous period and the treatment is stopped in the current period, then the up-shift would have been noticed in the previous period while the current period would see a fall-back. Hence, only the impact of a fall-back should be considered in the current period.

If, however, a treatment is applied in the current period, process 600 will flow from block 616 to process block 620 where both up-shift and fall-back are applied. In this case, it is important to decide on the order in which these impacts are applied on the base forecasting model. In a preferred embodiment, the fall-back is applied first, followed by the up-shift application. Due to this order, the up-shift is applied on a population that has "fallen back" and thus is a more conservative number.

Figure 7B:
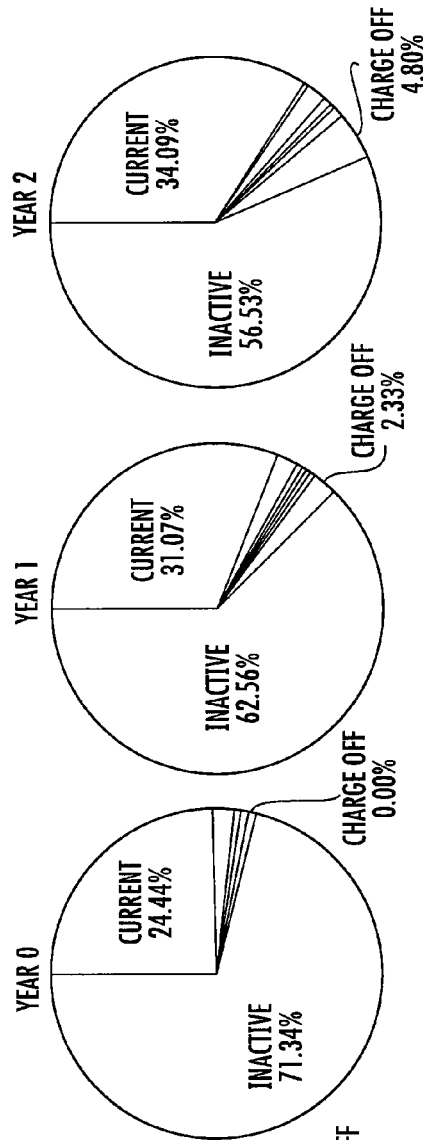

FIGS. 7A-E combine to provide an example graphical user interface (i.e., a display interface 700 output to a user using a display device) illustrating a potential forecast model shown in accordance with one embodiment of the invention. The display interface 700 illustrates a typical forecast model and is depicted in a piecemeal fashion from FIG. 7A to FIG. 7E. Turning to FIG. 7A, the display interface 700 illustrates the assumption values generally used to forecast lending account lateness. These values provide the foundation for the forecasting model and include an input window 702 and a treatment window 704.

The input window 702 displays the initial lending account population distribution. As shown in display interface 700, the input window 702 is equivalent in function to the lateness buckets described with respect to FIG. 2 and FIG. 3. The buckets in the input window 702 include a "CURRENT" bucket, a bucket containing accounts that have a payment that is thirty days past due ("30DPD"), a bucket containing accounts that have a payment between thirty and sixty days past due ("60DPD"), a 90DPD bucket, a 120DPD bucket, a 150DPD bucket, a 180+DPD bucket, and an "INACTIVE" bucket that includes accounts having no activity and carrying a zero balance. In addition to the lateness buckets, there is also a category labeled "TOTAL." This TOTAL bucket represents the entire lending account portfolio.

Each bucket illustrated in the input window 702 has a corresponding population value. The population value designated next to each bucket represents the number of accounts in a given bucket prior to the first period recognized in the forecasting model. As illustrated in the input window 702, the "CURRENT" bucket has a population of 2,067,812 lending accounts prior to the initial period. In addition to the population totals, the input window 702 maintains information relating to the total value of the lending account population. In the example display interface 700, the total outstanding balance stands at $13,497,667,504. The nearly 13.5 billion dollar outstanding balance illustrates the massive stake a lender can have in its lending accounts and the importance in accurately forecasting lending losses related to this value.

The treatment window 704 represents forecasting guidelines for future periods. The treatment window 704 is similar to the input window 702 in that the treatment window 704 represents the initial values utilized by the forecasting model. As illustrated, the treatment window 704 includes treatment assumptions for future periods, offer acceptance rates, offer redemption rates, and a fall-back rate. The treatment assumptions include projected treatment periods, acceptance rates, redemption rates, and a fall-back rate. As illustrated, a treatment will be applied in Year 1, but will not be applied in any other year. It should follow then, that an up-shift will be seen in Year 1, followed by a fall-back in Year 2. The up-shift and fall-back projections are determined through the use of acceptance and redemption rates. It is important to note that Year 0 is not listed in this chart. Year 0 is not listed because during this period, the natural migration factors will be calculated.

Returning to the treatment window 704, the acceptance and redemption rates follow the principles described above and are calculated for each of the lateness buckets included in the input window 702 with two exceptions described below. As described previously, the acceptance rates represent the projected percentage of accounts in a lateness bucket that would accept a treatment. The redemption rates represent the percentage of accounts in a given lateness bucket that are projected to accept a treatment and fulfill the treatment requirements, thereby receiving the incentive. As described previously, acceptance and redemption rates are calculated/estimated for each lateness bucket and implemented in the up-shift and fall-back calculations in order to more accurately forecast lending account losses.

As mentioned above, the acceptance and redemption rates are calculated/estimated for each bucket included in the input window 702 as well as two additional buckets. The acceptance and redemption rates are also calculated/estimated for special buckets labeled "ATTRITION" and "CHARGE OFF". In general terms, charge off is the declaration by a lender that an amount of debt is unlikely to be collected. As such, the "CHARGE OFF" bucket represents the accounts that have been forcibly closed or written-off as losses. In these cases, the lending account has defaulted on the balance and the lender, after exerting all collection efforts, identifies the account as a "bad loan." The lender will close the account without the request of the lending account owner and will write-off the amount of the account balance as a loss. Conversely, accounts in attrition are those that are voluntarily closed by the lending account owner. In instances of attrition, the lending account owner does not want to use the lending account anymore and asks the lender to close the account. In order to receive a status of attrition, the lending account owner must pay off the balance of the lending account. By taking these accounts into consideration, the forecasting model can more accurately predict losses due to poor lateness.

Finally, the treatment window 704 includes the fall-back rate. As described previously, the fall-back rate represents the projected percentage of accounts that would revert to poor lateness after a treatment was stopped. In the example display interface 700, the fall-back rate is shown as 50%. This means that half of the accounts who redeem a treatment and achieve a current lateness status will suffer from fallback when the treatment is stopped. The input window 702 and the treatment window 704 as shown in the display interface 700 combine to create the foundation for the forecasting model described herein by providing initial bucket values as well as projected treatment rates. With this information, accurate projections can be made after migration factors have been calculated following a single period.

FIG. 7B illustrates an example forecasting matrix that utilizes the basic input information from the input window 702 in FIG. 7A. FIG. 7B illustrates a base case matrix 706 and a base case progression chart 708 within the display interface 700. The base case matrix 706 illustrates an example forecasting matrix, without treatments, according to one embodiment of the invention. This matrix includes the population distribution for each lateness bucket across six, year-long periods and includes the lateness populations as entered into the input window 702. The "Year 0" column reflects the input window 702 values. As described above, the migration factors for the most recent period are computed by comparing the lateness status of the portfolio at the beginning period to the lateness status at the ending period. In the base case matrix 706, the initial period during which the natural migration factors are calculated would be the intervening time between Year 0 and Year 1. The calculated migration factors would then be applied to the remaining years (2-5) in order to forecast lending account losses due to lateness. Moving forward from Year 1, the calculated natural migration factors would be used to forecast lateness for the remaining years. FIG. 7B also includes the initial portion of the base case progression chart 708. The base case progression chart 708 is simply another way of representing the figures of the base case matrix 706.

Figure 7C:
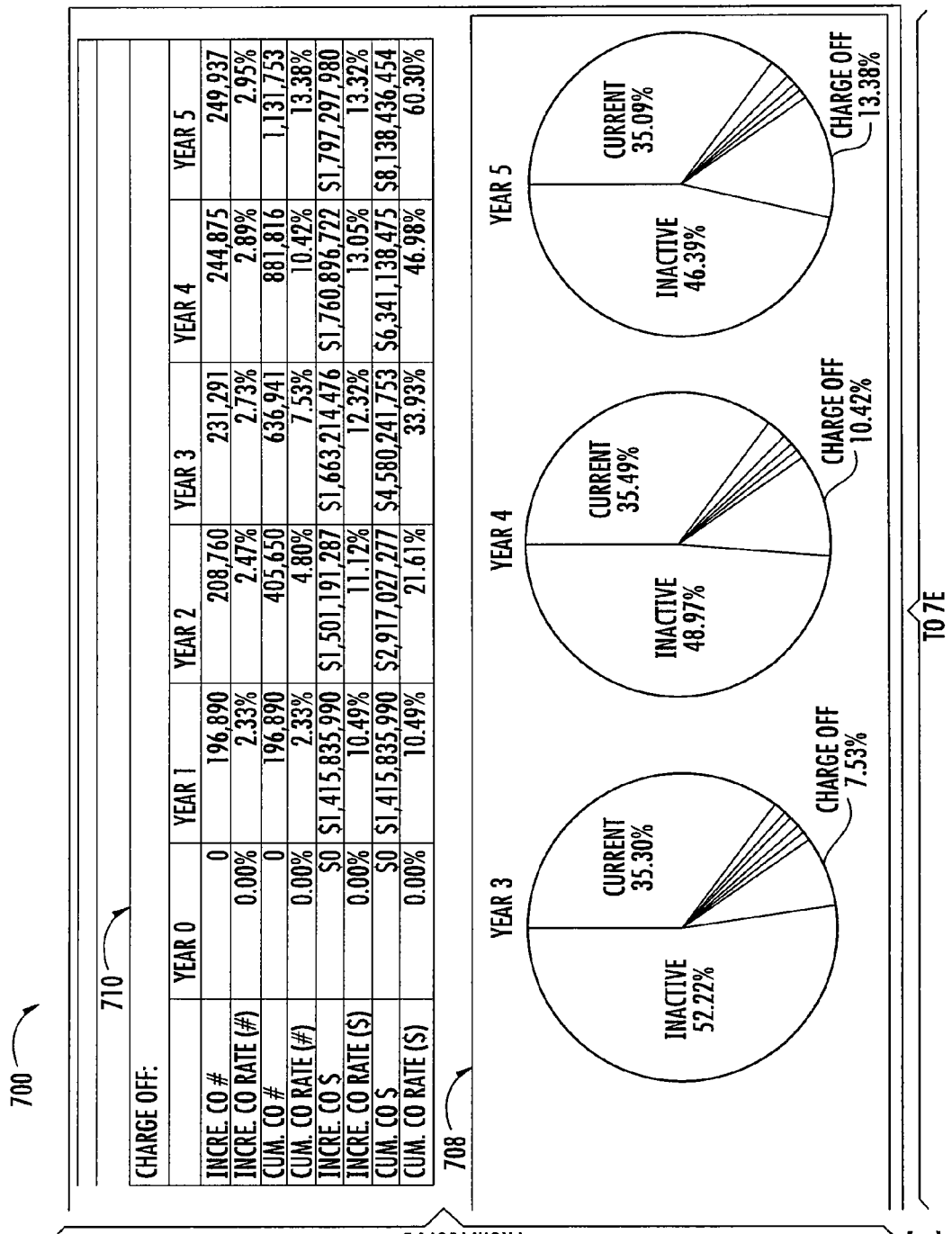

FIG. 7C illustrates the remaining portion of the base case progression chart 708 as well as the base case charge off matrix 710. Both the base case progression chart 708 and the base case charge off matrix 710 are subsections of the display interface 700. As described previously, the base case progression chart 708 is another format for illustrating the base case matrix 706 that is shown in FIG. 7B. FIG. 7C simply illustrates the final 3 years of the base case matrix 706. The base case charge off matrix 710, however, illustrates one of the goals of the forecasting model, which is predicting lending account losses due to poor lateness.

The base case charge off matrix 710 illustrates the total number and value of charge off accounts as forecasted by one embodiment of the present invention, wherein no treatments are involved. Included in the table are projections for the incremental (year by year) number of charge offs, incremental charge off rates, cumulative number of charge offs, cumulative charge off rates, incremental charge off account values, incremental charge off account value percentages, cumulative charge off account values, and cumulative charge off account value percentages. The incremental number of charge offs represents the total number of accounts that enter charge off in a particular year. The incremental charge off rates represent the percentage of lending accounts that enter into charge off as compared to the total number of lending accounts in the lending account portfolio for a given year. The cumulative charge off number and rate represent similar values to the incremental figures but are adjusted to incorporate all of the data up to a given year. It is important to note that the cumulative charge off number and rate do not represent any new accounts that may be opened in future years. Instead, these rates only reflect a projection of accounts currently held by the lender. The base case charge off matrix 710 also includes projected dollar values for each of the incremental and cumulative tallying methods as is displayed in the lower half of the matrix.

Figure 7D:
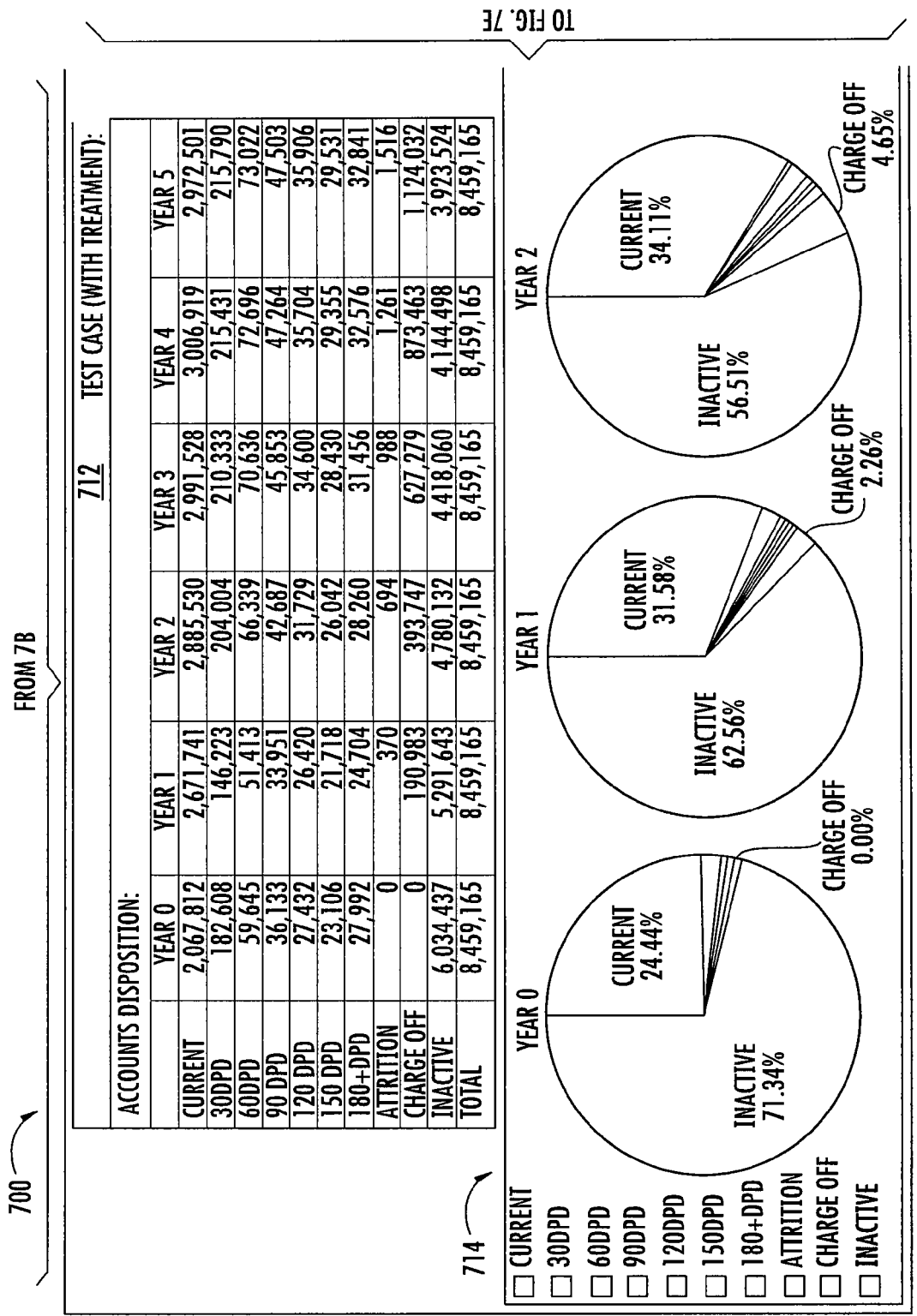

FIG. 7D illustrates an example forecasting matrix that utilizes the basic input information from the input window 702 in FIG. 7A in combination with the treatment window 704 found in FIG. 7A. FIG. 7D illustrates a test case matrix 712 and a portion of the test case progression chart 714 within the display interface 700. The test case matrix 712 illustrates an example forecasting matrix, with treatments, according to one embodiment of the invention. This matrix includes the population distribution for each lateness bucket across six year-long periods and includes the lateness populations as entered into the input window 702. The "Year 0" column reflects the input window 702 values. As described above, the migration factors for the most recent period are computed by comparing the lateness status of the portfolio at the beginning period to the lateness status at the ending period. In the test case matrix 712, the initial period during which the migration factors are calculated would be the intervening time between Year 0 and Year 1. The calculated migration factors would then be applied in order to forecast lending account losses due to lateness for the remaining years (2-5).

In addition to using the migration factors, however, the test case matrix 712 utilizes the information from the treatment window 704. As described in the treatment window 704 of FIG. 7A, a treatment is applied during Year 1 and is not applied during any other year. As described above, a treatment during Year 1 means that an up-shift will be seen following Year 1 (Year 2 figures). Similarly, when the treatment stops in Year 2, a fall-back will be seen in Year 3. This idea is difficult to illustrate in the test case matrix 712 because of the large shift resulting from the natural migration in the Year 0. As a result, the up-shift and subsequent fall-back will be most readily apparent in FIG. 7E. In addition to the test case matrix 712, FIG. 7D includes the initial portion of the base case progression chart 714. The test case progression chart 714 is simply another way of representing the figures of the test case matrix 712.

Figure 7E:
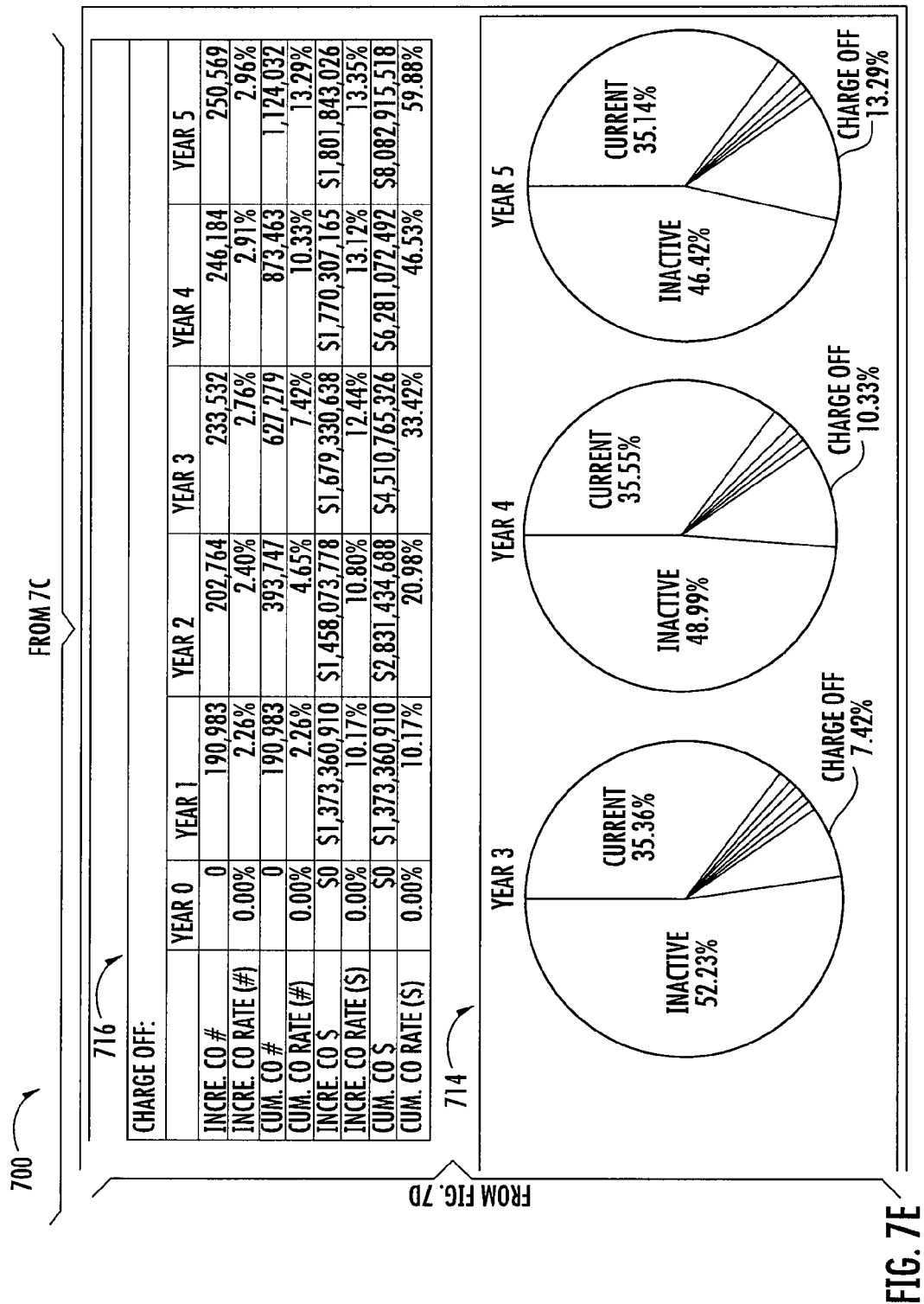

FIG. 7E illustrates the remainder of the test case progression chart 714 and the test case charge off matrix 716. Both the test case progression chart 714 and the test case charge off matrix 716 are subsections of the display interface 700. As described previously, the test case progression chart 714 is another format for illustrating the test case matrix 712 that is shown in FIG. 7D. FIG. 7E simply illustrates the final 3 years of the test case matrix 712. The test case charge off matrix 716, however, illustrates another one of the goals of the forecasting model, which is predicting lending account losses due to lateness when treatments are utilized.

The test case charge off matrix 716 illustrates the total number and value of charge off accounts as forecasted by one embodiment of the present invention, wherein no treatments are involved. Included in the table are projections for the incremental (year by year) number of charge offs, incremental charge off rates, cumulative number of charge offs, cumulative charge off rates, incremental charge off account values, incremental charge off account value percentages, cumulative charge off account values, and cumulative charge off account value percentages. The incremental number of charge offs represents the total number of accounts that enter charge off in a particular year. The incremental charge off rates represent the percentage of lending accounts that enter into charge off as compared to the total number of lending accounts in the lending account portfolio for a given year. The cumulative charge off number and rate represent similar values to the incremental figures but are adjusted to incorporate all of the data up to a given year. It is important to note that the cumulative charge off number and rate do not represent any new accounts that may be opened in future years. Instead, these rates only reflect a projection of accounts currently held by the lender. The test case charge off matrix 716 also includes projected dollar values for each of the incremental and cumulative tallying methods as is displayed in the lower half of the matrix. It is important to note that the values illustrated in the test case charge off matrix 716 represent projected losses when treatments are utilized to cure lending account lateness.

When viewing the test case charge off matrix 716 in comparison to the base case charge off matrix 710 it is clear that the treatments have an effect. The incremental charge off rate row shows a Year 1 base rate of 2.33% (FIG. 7C), whereas the same row shows a Year 1 treatment rate of 2.26%. The Year 2 figures show an equal percentage increase for the base case and the treatment rate, however, a closer look into the incremental charge off numbers reveals that the treatment charge off rate drops slightly. This slight rate drop represents the effect of the up-shift. The major difference in the example display interface 700 is revealed in the Year 3 figures where fall-back occurs. Here, there is a 0.16% increase in the charge off rate for the base case, while the test case suffers from a massive 0.36% increase. This increase effectively illustrates the concept of fall back when a treatment is stopped. Moving forward, we see that the increase in charge off rates for the base and test cases remain almost constant with respect to each other, signaling a return to natural migration for the test case lending accounts.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus comprising:
   a memory device comprising population information and a plurality of migration factors stored therein, wherein the population information comprises information about population distribution across a plurality of classifications, and wherein each of the plurality of migration factors corresponds to a particular classification of the plurality of classifications and indicates how population members of the particular classification migrate to other classifications over a particular time period;

wherein the memory device further comprises at least one treatment factor stored therein, wherein the at least one treatment factor indicates how a treatment applied to the population is expected to affect migration across the classifications over the particular time period, the treatment comprising an offer of an incentive for a population member of a particular classification to migrate to another classification, wherein the at least one treatment factor comprises a treatment up-shift factor that represents a percentage of population members of a particular classification that will move to a different classification as a result of the treatment being applied to the population, and wherein the at least one treatment factor comprises a treatment fall-back factor that represents a percentage of population members of a particular classification that will move to a different classification as a result of the treatment being stopped; and the apparatus further comprising:

a processor communicably coupled to the memory device and configured to:

use the migration factors and the population information to forecast changes in the population distribution across each of the plurality of classifications over multiple time periods;

use at least one of the migration factors to forecast changes in the population distribution for a particular time period if the treatment is not applied in the particular time period and was not applied in an immediately preceding time period to the particular time period;

use the treatment up-shift factor in conjunction with at least one of the migration factors to forecast changes in the population distribution for the particular time period if the treatment is applied in the particular time period but was not applied in the immediately preceding time period;

use the treatment fall-back factor in conjunction with at least one of the migration factors to forecast changes in the population distribution for the particular time period if the treatment is not applied in the particular time period but was applied in the immediately preceding time period; and use the treatment fall-back factor and the treatment up-shift factor in conjunction with at least one of the migration factors to forecast changes in the population distribution for the particular time period if the treatment is applied in the particular time period and was applied in the immediately preceding time period.

2. The apparatus of claim 1, wherein each of the plurality of migration factors comprises a percentage representing a percentage of population members of a particular classification that will move to a different classification or remain in the particular classification.

3. The apparatus of claim 1, wherein the processor is configured to multiply a total population of each of the plurality of classifications by one or more of the plurality of migration factors to determine a first forecasted population of each of the plurality of classifications after a first time period and then multiply the first forecasted population of each of the plurality of classifications by one or more of the plurality of migration factors to determine a second forecasted population of each of the plurality of classifications after a second time period.

4. The apparatus of claim 1, wherein the population information comprises information about population distribution changes over a past period of time, and wherein the processor is configured to use the information about population distribution changes over a past period of time to calculate the plurality of migration factors.

5. The apparatus of claim 1, further comprising:
a user output device configured to display the forecasted changes in the population distribution across each of the plurality of classifications over multiple time periods.

6. The apparatus of claim 1, further comprising:
a user input device configured to receive user input specifying the at least one treatment factor.

7. The apparatus of claim 1, wherein the population comprises a lending account portfolio, wherein the plurality of classifications comprises a plurality of levels of lateness, and wherein each of the plurality of migration factors indicates how many lending accounts of a particular lateness level will move to other lateness levels or will remain in the current lateness level over the particular time period.

8. The apparatus of claim 1, wherein the population comprises a lending account portfolio, wherein the plurality of classifications comprises a plurality of levels of lateness, and wherein each of the plurality of migration factors indicates how much money associated with a particular lateness level will move to be associated with other lateness levels or will remain associated with the current lateness level over the particular time period.

9. A method comprising:
storing population information and a plurality of migration factors in a memory device, wherein the population information comprises information about population distribution across a plurality of classifications, and wherein each of the plurality of migration factors corresponds to a particular classification of the plurality of classifications and indicates how population members of the particular classification migrate to other classifications over a particular time period;

storing at least one treatment factor in the memory device, wherein the at least one treatment factor indicates how a treatment applied to the population is expected to affect migration across the classifications over the particular time period, the treatment comprising an offer of an incentive for a population member of a particular classification to migrate to another classification, wherein the at least one treatment factor comprises a treatment up-shift factor that represents a percentage of population members of a particular classification that will move to a different classification as a result of the treatment being applied to the population, wherein the at least one treatment factor comprises a treatment fall-back factor that represents a percentage of population members of a particular classification that will move to a different classification as a result of the treatment being stopped;

using a processor to use the migration factors and the population information to forecast changes in the population distribution across each of the plurality of classifications over multiple time periods;

using a processor to use the at least one treatment factor in conjunction with the migration factors and the population information to forecast changes in the population distribution across each of the plurality of classifications over multiple time periods when the treatment is applied;

comparing changes in the population distribution across each of the plurality of classifications over multiple time periods when the treatment is applied and when the treatment is not applied;

using at least one of the migration factors to forecast changes in the population distribution for a particular time period if the treatment is not applied in the particular time period and was not applied in an immediately preceding time period to the particular time period;

using the treatment up-shift factor in conjunction with at least one of the migration factors to forecast changes in the population distribution for the particular time period if the treatment is applied in the particular time period but was not applied in the immediately preceding time period;

using the treatment fall-back factor in conjunction with at least one of the migration factors to forecast changes in the population distribution for the particular time period if the treatment is not applied in the particular time period but was applied in the immediately preceding time period; and using the treatment fall-back factor and the treatment up-shift factor in conjunction with at least one of the migration factors to forecast changes in the population distribution for the particular time period if the treatment is applied in the particular time period and was applied in the immediately preceding time period.

10. The method of claim 9, comprising:
using the processor to multiply a total population of each of the plurality of classifications by one or more of the plurality of migration factors to determine a first forecasted population of each of the plurality of classifications after a first time period; and using the processor to multiply the first forecasted population of each of the plurality of classifications by one or more of the plurality of migration factors to determine a second forecasted population of each of the plurality of classifications after a second time period.

11. The method of claim 9, wherein the population information comprises information about population distribution changes over a past period of time, and wherein the method further comprises:
using a processor to use the information about population distribution changes over a past period of time to calculate the plurality of migration factors.

12. The method of claim 9, further comprising:
displaying to a user the forecasted changes in the population distribution across each of the plurality of classifications over multiple time periods.

13. The method of claim 9, wherein the population comprises a lending account portfolio, wherein the plurality of classifications comprises a plurality of levels of lateness, and wherein each of the plurality of migration factors indicates how many lending accounts of a particular lateness level will move to other lateness levels or will remain in the current lateness level over the particular time period.

14. An apparatus comprising:
a memory device comprising a plurality of migration factors and lending account data for a plurality of lending accounts of a lender's lateness portfolio, wherein the lending account data comprises a plurality of lateness levels and information about a number of lending accounts currently in each lateness level or an amount of money associated with a number of lending accounts currently in each lateness level, and wherein each of the plurality of migration factors corresponds to a particular lateness level and indicates how the number of lateness accounts or the money in a particular lateness level migrates to other lateness levels over a particular time period;

wherein the memory device further comprises at least one treatment factor stored therein, wherein the at least one treatment factor indicates how a treatment applied to the population is expected to affect migration across the classifications over the particular time period, the treatment comprising an offer of an incentive for a population member of a particular classification to migrate to another classification, wherein the at least one treatment factor comprises a treatment up-shift factor that represents a percentage of lending accounts of a particular lateness level that will move to a different lateness level as a result of the treatment being applied, and wherein the at least one treatment factor comprises a treatment fall-back factor that represents a percentage of lending accounts of a particular lateness level that will move to a different lateness level as a result of the treatment being stopped; and the apparatus further comprising:

a processor configured to:
use the migration factors and the lending account data to forecast future lateness portfolio distribution across each of the plurality of lateness levels over multiple time periods use at least one of the migration factors to forecast changes in the lending account portfolio for a particular time period if the treatment is not applied in the particular time period and was not applied in an immediately preceding time period to the particular time period;

use the treatment up-shift factor in conjunction with at least one of the migration factors to forecast changes in the lending account portfolio for a particular time period if the treatment is applied in the particular time period but was not applied in the immediately preceding time period;

use the treatment fall-back factor in conjunction with at least one of the migration factors to forecast changes in the lending account portfolio for a particular time period if the treatment is not applied in the particular time period but was applied in the immediately preceding time period; and use the treatment fall-back factor and the treatment up-shift factor in conjunction with at least one of the migration factors to forecast changes in the lending account portfolio for a particular time period if the treatment is applied in the particular time period and was applied in the immediately preceding time period.

15. The apparatus of claim 14, wherein each of the plurality of migration factors comprises a percentage representing a percentage of the number of lending accounts or the money in a particular lateness level that will move to a different classification or remain in the particular classification.

16. The apparatus of claim 14, wherein the processor is configured to multiply a total population of each of the plurality of lateness levels by one or more of the plurality of migration factors to determine a first forecasted population of each of the plurality of lateness levels after a first time period and then multiply the first forecasted population of each of the plurality of lateness levels by one or more of the plurality of migration factors to determine a second forecasted population of each of the plurality of lateness levels after a second time period.

17. The apparatus of claim 14, wherein the lending account data comprises information about lateness portfolio distribution changes over a past period of time, and wherein the processor is configured to use the information about lateness portfolio distribution changes over a past period of time to calculate the plurality of migration factors.

18. The apparatus of claim 14, further comprising:
a user output device configured to display the forecasted changes in the lateness portfolio distribution across each of the plurality of lateness levels over multiple time periods.

19. The apparatus of claim 14, wherein the memory device comprises at least one treatment factor stored therein, wherein the at least one treatment factor indicates how a treatment applied to the lateness portfolio is expected to affect migration across the lateness levels over the particular time period.

20. The apparatus of claim 19, wherein the at least one treatment factor comprises a treatment up-shift factor that represents a percentage of lending accounts or money of a particular lateness level that will move to a different lateness level as a result of the treatment being applied to the lateness portfolio, and wherein the at least one treatment factor comprises a treatment fall-back factor that represents a percentage of lending accounts or money of a particular lateness level that will move to a different lateness level as a result of the treatment being stopped.

21. The apparatus of claim 19, further comprising:
a user input device configured to receive user input specifying the at least one treatment factor.

22. A method comprising:
determining a current lateness level of each lending account of a lending account portfolio;
using the lending account portfolio to calculate a set of migration factors over the course of an initial period;
determining at least one treatment factor indicating how a treatment applied to the population is expected to affect migration across the classifications over the particular time period, the treatment comprising an offer of an incentive for a population member of a particular classification to migrate to another classification, wherein the at least one treatment factor comprises a treatment up-shift factor that represents a percentage of lending accounts of a particular lateness level that will move to a different lateness level as a result of the treatment being applied, and wherein the at least one treatment factor comprises a treatment fall-back factor that represents a percentage of lending accounts of a particular lateness level that will move to a different lateness level as a result of the treatment being stopped;
using a computer to apply the migration factors and the at least one treatment factor to the lending account portfolio to predict a future lending account portfolio;
storing the future lending account portfolio in a memory device;
using at least one of the migration factors to forecast changes in the lending account portfolio for a particular time period if the treatment is not applied in the particular time period and was not applied in an immediately preceding time period to the particular time period;
using the treatment up-shift factor in conjunction with at least one of the migration factors to forecast changes in the lending account portfolio for a particular time period if the treatment is applied in the particular time period but was not applied in the immediately preceding time period;
using the treatment fall-back factor in conjunction with at least one of the migration factors to forecast changes in the lending account portfolio for a particular time period if the treatment is not applied in the particular time period but was applied in the immediately preceding time period; and
using the treatment fall-back factor and the treatment up-shift factor in conjunction with at least one of the migration factors to forecast changes in the lending account portfolio for a particular time period if the treatment is applied in the particular time period and was applied in the immediately preceding time period.

23. The method of claim 22, wherein using the computer to apply the migration factors to the lending account portfolio comprises:
multiplying a total population of each of a plurality of lateness levels by one or more of the set of migration factors to determine a first forecasted population of each of the plurality of lateness levels after a first time period; and
multiplying the first forecasted population of each of the plurality of lateness levels by one or more of the set of migration factors to determine a second forecasted population of each of the plurality of lateness levels after a second time period.

24. The method of claim 22 further comprising:
displaying a representation of the future lending account portfolio over multiple time periods.

25. A computer program product comprising a non-transitory computer readable medium having computer executable program code stored therein, wherein the computer executable program code comprises:
a first executable portion configured to determine a current lateness level of each lending account of a lending account portfolio;
a second executable portion configured to use the lending account portfolio to calculate a set of migration factors over the course of an initial period;
a third executable portion configured to receive at least one treatment factor indicating how a treatment applied to the population is expected to affect migration across the classifications over the particular time period, the treatment comprising an offer of an incentive for a population member of a particular classification to migrate to another classification, wherein the at least one treatment factor comprises a treatment up-shift factor that represents a percentage of lending accounts of a particular lateness level that will move to a different lateness level as a result of the treatment being applied, and wherein the at least one treatment factor comprises a treatment fall-back factor that represents a percentage of lending accounts of a particular lateness level that will move to a different lateness level as a result of the treatment being stopped; and
a fourth executable portion configured to apply the migration factors and the at least one treatment factor to the lending account portfolio to predict a future lending account portfolio, wherein the fourth executable portion is further configured to:
use at least one of the migration factors to forecast changes in the lending account portfolio for a particular time period if the treatment is not applied in the particular time period and was not applied in an immediately preceding time period to the particular time period;
use the treatment up-shift factor in conjunction with at least one of the migration factors to forecast changes in the lending account portfolio for a particular time period if the treatment is applied in the particular time period but was not applied in the immediately preceding time period;

use the treatment fall-back factor in conjunction with at least one of the migration factors to forecast changes in the lending account portfolio for a particular time period if the treatment is not applied in the particular time period but was applied in the immediately preceding time period; and use the treatment fall-back factor and the treatment up-shift factor in conjunction with at least one of the migration factors to forecast changes in the lending account portfolio for a particular time period if the treatment is applied in the particular time period and was applied in the immediately me period.

26. The computer program product of claim 25, further comprising:

an executable portion configured multiply a total population of each of a plurality of lateness levels by one or more of the set of migration factors to determine a first forecasted population of each of the plurality of lateness levels after a first time period, and then multiply the first forecasted population of each of the plurality of lateness levels by one or more of the set of migration factors to determine a second forecasted population of each of the plurality of lateness levels after a second time period.

27. The computer program product of claim 25, further comprising:

an executable portion configured to display a representation of the future lending account portfolio over multiple time periods.

28. The computer program product of claim 25, further comprising:

an executable portion configured to determine at least one treatment factor, wherein the at least one treatment factor indicates how a treatment applied to the lending account portfolio is expected to affect migration across a plurality of lateness levels over a particular time period, and use the treatment factor to analyze how the treatment affects the future lending account portfolio over multiple time periods.

* * * * *